US008654630B2

(12) United States Patent
Lei et al.

(10) Patent No.: US 8,654,630 B2
(45) Date of Patent: Feb. 18, 2014

(54) TECHNIQUES FOR LINK REDUNDANCY IN LAYER 2 NETWORKS

(75) Inventors: Tse Yu Lei, San Jose, CA (US); Ram Dular Singh, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 419 days.

(21) Appl. No.: 12/847,779

(22) Filed: Jul. 30, 2010

(65) Prior Publication Data

US 2011/0228669 A1      Sep. 22, 2011

Related U.S. Application Data

(60) Provisional application No. 61/315,889, filed on Mar. 19, 2010.

(51) Int. Cl.
*G06F 11/00* (2006.01)

(52) U.S. Cl.
USPC .......................................... 370/219; 370/225

(58) Field of Classification Search
USPC ......... 370/217–220, 221–224, 225, 228, 389, 370/392, 400–401, 437, 465
See application file for complete search history.

(56) References Cited

U.S. PATENT DOCUMENTS

| | | | |
|---|---|---|---|
| 5,473,599 A | 12/1995 | Li et al. | |
| 6,032,194 A | 2/2000 | Gai et al. | |
| 6,285,656 B1 | 9/2001 | Chaganty et al. | |
| 6,304,575 B1 | 10/2001 | Carroll et al. | |
| 6,366,557 B1 * | 4/2002 | Hunter | 370/217 |
| 6,373,826 B1 | 4/2002 | Russell et al. | |
| 6,397,260 B1 | 5/2002 | Wils et al. | |
| 6,470,395 B1 | 10/2002 | Van Aken et al. | |
| 6,493,825 B1 | 12/2002 | Blumenau et al. | |
| 6,501,756 B1 | 12/2002 | Katsube et al. | |
| 6,535,490 B1 | 3/2003 | Jain | |
| 6,556,541 B1 | 4/2003 | Bare | |
| 6,594,228 B1 * | 7/2003 | Naidoo et al. | 370/217 |
| 6,717,922 B2 | 4/2004 | Hsu et al. | |
| 6,728,777 B1 | 4/2004 | Lee et al. | |
| 6,766,482 B1 | 7/2004 | Yip et al. | |
| 6,813,250 B1 | 11/2004 | Fine et al. | |
| 6,839,348 B2 | 1/2005 | Tang et al. | |

(Continued)

OTHER PUBLICATIONS

Chakraborty, et al, "Improvement in Reliability of the Token Ring Network by Reversal of Token in Case of a Single Component Failure," IEEE. 1993. pp. 1152-1154.

(Continued)

*Primary Examiner* — Kevin Mew
(74) *Attorney, Agent, or Firm* — Fountainhead Law Group, PC

(57) ABSTRACT

Techniques for facilitating link redundancy using an enhanced version of Virtual Switch Redundancy Protocol (VSRP), referred to herein as VSRP2. In one set of embodiments, a group of Layer 2 and/or Layer 2/3 devices (switches) can act in concert as a VSRP2 virtual switch. A first switch in the group (a VSRP2 master switch) can forward, via a first link, data traffic to/from a network device in a connected Layer 2 network. A second switch in the group (a VSRP2 backup switch) can block, at a second link, data traffic to/from the same network device. If the first link fails or otherwise becomes unavailable, the VSRP2 backup switch can detect the link failure and begin forwarding, via the second link, data traffic to/from the network device. In this manner, redundancy can be provided at the link level between the VSRP2 virtual switch and the Layer 2 network.

19 Claims, 14 Drawing Sheets

(56) References Cited

U.S. PATENT DOCUMENTS

| | | | |
|---|---|---|---|
| 6,850,531 B1 | 2/2005 | Rao et al. | |
| 6,856,591 B1 | 2/2005 | Ma et al. | |
| 6,879,594 B1 | 4/2005 | Lee et al. | |
| 6,891,808 B2 | 5/2005 | Ishii | |
| 6,895,528 B2* | 5/2005 | Cantwell et al. | 714/12 |
| 6,952,397 B2 | 10/2005 | Mor et al. | |
| 6,954,436 B1 | 10/2005 | Yip et al. | |
| 6,987,740 B1 | 1/2006 | Di Benedetto et al. | |
| 7,003,705 B1 | 2/2006 | Yip et al. | |
| 7,027,406 B1 | 4/2006 | Shabtay et al. | |
| 7,065,041 B2* | 6/2006 | Sen | 370/227 |
| 7,126,923 B1 | 10/2006 | Yang et al. | |
| 7,154,861 B1 | 12/2006 | Merchant et al. | |
| 7,209,435 B1* | 4/2007 | Kuo et al. | 370/219 |
| 7,289,496 B2 | 10/2007 | Donoghue et al. | |
| 7,340,535 B1 | 3/2008 | Alam | |
| 7,359,984 B1 | 4/2008 | Hackney | |
| 7,389,359 B2 | 6/2008 | Jain et al. | |
| 7,389,496 B2 | 6/2008 | Eckhart et al. | |
| 7,428,214 B2* | 9/2008 | Nosella | 370/228 |
| 7,463,581 B1* | 12/2008 | Ellis et al. | 370/228 |
| 7,558,195 B1* | 7/2009 | Kuo et al. | 370/219 |
| 7,603,480 B2* | 10/2009 | Imai et al. | 709/239 |
| 7,778,158 B2* | 8/2010 | Vogel et al. | 370/217 |
| 8,014,301 B2 | 9/2011 | Kuo et al. | |
| 8,107,360 B2* | 1/2012 | Patel et al. | 370/217 |
| 8,400,912 B2* | 3/2013 | Busch et al. | 370/228 |
| 2002/0131414 A1 | 9/2002 | Hadzic | |
| 2002/0184376 A1 | 12/2002 | Sternagle | |
| 2003/0037165 A1 | 2/2003 | Shinomiya | |
| 2003/0048501 A1* | 3/2003 | Guess et al. | 359/118 |
| 2003/0048746 A1 | 3/2003 | Guess et al. | |
| 2003/0086422 A1 | 5/2003 | Klinker et al. | |
| 2003/0142628 A1* | 7/2003 | Alonso et al. | 370/241 |
| 2003/0174725 A1 | 9/2003 | Shankar | |
| 2003/0179707 A1 | 9/2003 | Bare | |
| 2003/0189898 A1* | 10/2003 | Frick et al. | 370/227 |
| 2003/0193891 A1* | 10/2003 | Chen et al. | 370/217 |
| 2003/0193959 A1 | 10/2003 | Lui et al. | |
| 2003/0225908 A1 | 12/2003 | Srinivasan | |
| 2005/0185654 A1* | 8/2005 | Zadikian et al. | 370/395.21 |
| 2005/0262295 A1 | 11/2005 | Nataraj et al. | |
| 2006/0092862 A1 | 5/2006 | Benedetto | |
| 2006/0109782 A1* | 5/2006 | Ra et al. | 370/216 |
| 2007/0008942 A1 | 1/2007 | Ocepek et al. | |
| 2008/0089226 A1* | 4/2008 | Konuma et al. | 370/219 |
| 2009/0003213 A1 | 1/2009 | Tzeng | |
| 2009/0092043 A1* | 4/2009 | Lapuh et al. | 370/228 |
| 2009/0274153 A1 | 11/2009 | Kuo et al. | |
| 2009/0296565 A1* | 12/2009 | Kuo et al. | 370/219 |
| 2013/0019280 A1 | 1/2013 | Larson et al. | |

OTHER PUBLICATIONS

Cisco Systems Inc., "Understanding Spanning-Tree Protocol," 8 pages, Copyright 1989-1997.

"Functional Description: Health Check/Fabric Checksum," printed on Feb. 12, 2002, at URL: http://www.extremenetworks.com/services/HealthCheck.aspx, 5 pages.

IEEE Std 802.1D, IEEE Standard for Information Technology—Telecommunications and Information Exchange Between Systems—Local and Metropolitan Area Networks—Common Specifications, Part 3: Media Access Control (MAC) Bridges, *ANSI/IEEE* Std 802.1D, 1998, 373 pages.

IEEE Std 802.1w, IEEE Standard for Local and Metropolitan Area Networks—Common Specifications, Part 3: Media Access Control (MAC) Bridges—Amendment 2: Rapid Reconfiguration, IEEE Std 802.w-2001[Amendment to IEEE Std 802.1D, 1998 Edition (ISO/IEC 15802-3:1998) and IEEE Std 802.1t-2001], 116 pages.

IEEE Std P802.1s, Draft Standard for Local and Metropolitan Area Networks—Amendment 3 to 802.1q Virtual Bridged Local Area Networks: Multiple Spanning Tree, *IEEE*, P802.1s, D14.1, Jul. 2002, 225 pages.

Intel. RTM. Express 460T Standalone Switch Description of Spanning Tree Protocol, copyright 2002, 1 page, http://support.intel.com/support/express/switches/460/30280.htm.

Latif et al. "The IBM 8209 LAN Bridge," *IEEE Network*. May 1992. pp. 28-37.

Li et al., "Cisco Hot Standby Router Protocol" (HSRP), Mar. 1998, pp. 1-15.

Minimum Spanning Tree Demonstration Program; 1 page, printed on Feb. 12, 2002, at URL: http://www.engr.orst.edu/.about.girardma/javaProgs/minST/MinST.html.

Perry et al., "Novell, Source Routing and the Spanning-Tree Protocol," Aug. 1991, 38 pages, http://developer.nov/research/appnotes/1991/august/01.

Spanning Tree Software Package, Products, 3 pages, printed on Feb. 12, 2002, at URL: http://www.tassogroup.com/products.html.

Tech Brief, "Redundancy in the Application-Aware Data Center," Extreme Networks, copyright 2001, 6 pages; at URL: www.extremenetworks.com.

Virtual Router Redundancy Protocol (vrrp), Jan. 21, 2002, 31 pages, printed on Feb. 13, 2002, at URL: http://www.ietf.org/html.charters/vrrp-charter.html.

Whatis.com Word of the Day, 2 pages, Copyright 2000-2002, Tech Target.

Non-Final Office Action for U.S. Appl. No. 10/124,449, mailed on Jun. 13, 2006, 17 pages.

Notice of Allowance for U.S. Appl. No. 10/124,449, mailed on Feb. 28, 2007, 9 pages.

Non-Final Office Action for U.S. Appl. No. 10/261,946, mailed on Feb. 1, 2007, 12 pages.

Non-Final Office Action for U.S. Appl. No. 10/261,946, mailed on Sep. 13, 2007, 15 pages.

Advisory Action for U.S. Appl. No. 10/261,946, mailed on Jan. 16, 2008, 4 pages.

Non-Final Office Action for U.S. Appl. No. 10/261,946, mailed on Apr. 1, 2008, 9 pages.

Non-Final Office Action for U.S. Appl. No. 10/261,946, mailed on Nov. 6, 2008, 13 pages.

Final Office Action for U.S. Appl. No. 10/261,946, mailed on Apr. 22, 2009, 12 pages.

Non-Final Office Action for U.S. Appl. No. 10/261,946, mailed on Sep. 9, 2009, 18 pages.

Final Office Action for U.S. Appl. No. 10/261,946, mailed on Apr. 27, 2010, 27 pages.

Non-Final Office Action for U.S. Appl. No. 10/261,946, mailed on Feb. 10, 2011, 21 pages.

Final Office Action for U.S. Appl. No. 11/695,458, mailed on Mar. 19, 2009, 8 pages.

Notice of Allowance for U.S. Appl. No. 11/695,458, mailed on Apr. 16, 2009, 5 pages.

Non-Final Office Action for U.S. Appl. No. 12/477,069, mailed on Jan. 11, 2011, 25 pages.

Non-Final Office Action for U.S. Appl. No. 10/090,669, mailed on May 27, 2003.

Final Office Action for U.S. Appl. No. 10/090,669, mailed on Sep. 18, 2003.

Notice of Allowance for U.S. Appl. No. 10/090,669, mailed on Nov. 13, 2003.

Civil Action 10-332—Complaint for Patent Infringement, filed on Apr. 23, 2010, with Exhibits A through G, 131 pages.

Civil Action 10-332—Civil Cover Sheet, filed on Apr. 23, 2010, 1 page.

Civil Action 10-332—Second Amended and Supplemental Complaint for Patent Infringement, filed on Jul. 16, 2010, with Exhibits A through I, 158 pages.

Civil Action 10-332—Report on the Filing or Determination of an Action Regarding a Patent or Trademark, filed on Aug. 5, 2010, 2 pages.

Civil Action 10-332—Notice of Voluntary Dismissal Without Prejudice, filed on Aug. 5, 2010, 2 pages.

Civil Action—CV10-03428—Complaint for Patent Infringement, Trade Secret Misappropriation, Breach of Contract, Interference

(56) References Cited

OTHER PUBLICATIONS with Contract, and Unfair Competition Under Cal. Bus. & Prof. Code §§ 17200 et seq., filed on Aug. 4, 2010, with Exhibits A through M, 196 pages.
Civil Action CV10-03428—First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 237 pages, with Exhibits A through P.
Civil Action—Case No. CV10-03443—Complaint for Declaratory Judgment, filed on Aug. 6, 2010, with exhibits A through I, 153 pages.
Notice of Allowance for U.S. Appl. No. 12/477,069, mailed on Apr. 22, 2011, 13 pages.
Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 13, 2011, 238 pages, with Exhibits A through P.
Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 29, 2011, 318 pages, with Exhibits A through T.
Civil Action CV10-03428—A10 Networks, Inc.'s, Lee Chen's, Rajkumar Jalan's, Ron Szeto's, Liang Han's, and Steve Hwang's Answer to Third Amended Complaint, Affirmative Defenses, and A10's Counterclaims, Filed May 16, 2011, 40 pages.
Civil Action CV10-03428—Plaintiffs and Counterclaim Defendants Brocade Communications Systems, Inc. and Foundry Networks, LLC's Answer to Defendant A10 Networks, Inc.'s Counterclaims, Filed May 27, 2011, 12 pages.
Reexamination Documents for U.S. Patent No. 7,558,195, filed Jun. 27, 2011, 63 pages, included: Request for Reexamination Transmittal Form; Request for *Ex Parte* Reexamination; Form PTO/SB/08; Exhibit A—U.S. Patent No. 7,558,195; Exhibit B—Terminal Disclaimer; and Exhibit C—U.S. Patent Publication No. 2003/0048501.
Final Office Action for Ex Parte Reexamination of U.S. Patent No. 7,558,195, U.S. Appl. No. 90/011,771, mailed Jul. 19, 2012, 67 pages.
Lei, et al., "Method and Apparatus for Link Redundancy in Virtual Switch Redundancy Protocol," U.S. Appl. No. 61/315,889, filed Mar. 19, 2010, 21 pages.
"BlackDiamond 6800 Series Switch Hardware Installation Guide," Extreme Networks, Apr. 201, 93 pages.
ExtremeWare Software User Guide, Extreme Networks, Inc., Apr. 1999, 291 pages.
Office Action is Ex Parte Reexamination for Control No. 90/011,771, mailed Nov. 18, 2011, 15 pages.
Order Granting Request for Ex Parte Reexamination for Control No. 90/011,771, Jul. 22, 2011, 13 pages.
Ex Parte Reexamination Interview Summary for Control No. 90/011,771, Jul. 14, 2011, 3 pages.
Request for Inter Partes Reexamination for U.S. Patent No. 7,558,195 B1, request filed on Nov. 10, 2011, 104 pages. Included: Exhibits A and B.
Notice of Inter Partes Reexamination Request Filing Date for Control No. 95/001,815, mailed Nov. 30, 2011, 1 page.
Notice of Assignment of Inter Partes Reexamination Request for Control No. 95/001,815, mailed Nov. 30, 2011, 1 page.
Office Action in Inter Partes Reexamination for Control No. 95/001,815, mailed Dec. 16, 2011, 14 pages.
Civil Action—Case No. CV10-03443—Notice of Voluntary Dismissal Without Prejudice, filed Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Notice of Motion and Motion to Dismiss First Amended Complaint filed by A10 Networks, Inc., Lee Chen, Rajkumar Jalan, Ron Szeto. Motion Hearing set for Feb. 17, 2011 01:30 PM in Courtroom 4, 5th Floor, San Jose, filed Nov. 12, 2010, 34 pages.
Civil Action CV10-03428—Declaration of Scott R. Mosko in Support of Motion to Dismiss First Amended Complaint filed by A10 Networks, Inc., Lee Chen, Rajkumar Jalan, Ron Szeto, filed Nov. 12, 2010, 56 pages, with Exhibits A and B.
Civil Action CV10-03428—Memorandum in Opposition re Motion to Dismiss First Amended Complaint filed by Brocade Communications Systems, Inc., Foundry Networks, LLC, filed Jan. 27, 2011, 33 pages.
Civil Action CV10-03428—Reply to Opposition re Motion to Dismiss First Amended Complaint filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations filed by Brocade Communications Systems, Inc., Foundry Networks, LLC, filed Jul. 15, 2011, 20 pages, including Proposed Order.
Civil Action CV10-03428—Declaration of Siddhartha M. Venkatesan in Support of Opposition/Response to Motion, Plaintiffs' Opposition to Defendants' Motion to Stay Proceedings filed by Brocade Communications Systems, Inc., Foundry Networks, LLC, filed Jul. 15, 2011, 70 pages, including Exhibits A-E.
Civil Action CV10-03428—Reply to Plaintiffs' Opposition to Defendants' Motion to Stay Proceedings Pending Reexaminations filed by A10 Networks, Inc., filed Jul. 22, 2011, 34 pages, including Mosko Declaration, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 24, 2011, 34 pages, including Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for Tro and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of

(56) References Cited

OTHER PUBLICATIONS

Declaration of Fabio E. Marino ISO Plaintiffs' Motion for Tro and Preliminary Injunction filed by Brocade Communications Systems, Inc., Foundry Networks, LLC, filed Jul. 26, 2011, 5 pages.

Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.

Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for Tro and Preliminary Injunction filed by Brocade Communications Systems, Inc., Foundry Networks, LLC, filed Jul. 26, 2011, 3 pages.

Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages, including Redacted Exhibits 1-8.

Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 165 pages, including Exhibits 1-30. (due to size, reference will be uploaded in three parts).

Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.

Civil Action CV10-03428—Notice of Errata re Reply Memorandum in Further Support of Motion for Temporary Restraining Order and Preliminary Injunction by Brocade Communications Systems, Inc., Foundry Networks, LLC, filed Aug. 5, 2011, 2 pages.

Civil Action CV10-03428—Notice of Granted Requests for Reexamination of Patents 7,558,195, 7,657,629, 7,840,678, Filed Aug. 5, 2011, 316 pages. Included: Exhibits A through C.

Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.

Civil Action CV10-03428—Order Denying Motion for Temporary Restraining Order [Redacted Version] of Plaintiffs' Memorandum in Support of Motion for Temporary Restraining Order and Preliminary Injunction filed by Brocade Communications Systems, Inc., Foundry Networks, LLC, filed Aug. 16, 2011, 5 pages.

Civil Action CV10-03428—Joint Claim Construction, Filed Aug. 26, 2011, 29 pages.

Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, No Filing Date, 779 pages, Including Exhibits A through M. (due to size, reference will be uploaded in two parts).

Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.

Civil Action CV10-03428—Redacted Declaration of Dr. Chi Zhang in Support of Opposition to Plaintiffs' Motion for Temporary Restraining Order and Preliminary Injunction, by A10 Networks, Inc., filed Sep. 28, 2011, 4 pages.

Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.

Civil Action CV10-03428—Declaration of Teri H.P. Nguyen in Support of Motion for Partial Summary Judgment Notice of Motion and Motion for Partial Summary Judgment on Assignor Estoppel filed by Brocade Communications Systems, Inc., Foundry Networks, LLC, filed Oct. 11, 2011, 259 pages, including Exhibits A-R.

Civil Action CV10-03428—Motion for Summary Judgment of Noninfringement of U.S. Patent No. 7,558,195, filed by A10 Networks, Inc., Lee Chen, Rajkumar Jalan, filed Oct. 11, 2011, 12 pages. Included: Proposed Order.

Civil Action CV10-03428—Declaration of John Chiong in Support of Defendant and Counterclaim-Plaintiff A10 Networks, Inc.'s and Defendants Lee Chen's and Rajkumar Jalan's Motion for Summary Judgment of Noninfringement of U.S. Patent No. 7,558,195 filed by A10 Networks, Inc., Lee Chen, Rajkumar Jalan, filed Oct. 11, 2011, 3 pages.

Civil Action CV10-03428—Initial Claim Construction Brief, filed by Brocade Communications Systems, Inc., Foundry Networks, LLC, filed Oct. 11, 2011, 31 pages.

Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Patent No. 7,558,195 filed by A10 Networks, Inc., Lee Chen, Rajkumar Jalan, filed Oct. 11, 2011, 119 pages. Included: Exhibits 1 through 4.

Civil Action CV10-03428—Declaration of Nitin Gambhir of Brocade Communications Systems, Inc. and Foundry Networks, LLC's Motion for Summary Judgment of Infringement of U.S. Patent Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.

Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief filed by Brocade Communications Systems, Inc., Foundry Networks, LLC, filed Oct. 13, 2011, 8 pages. including Proposed Order and Declaration.

Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.

Civil Action CV10-03428—Declaration of Nitin Gambhir in Support of Brocade Communications Systems, Inc.'s and Foundry Networks, LLC's (1) Motion for Partial Summary Judgment of Infringement of U.S. Patent Nos. 7,647,427 and 7,716,370 [Filed Under Seal]; (2) Opposition to Defendants' Motion for Summary Judgment of Non-Infringement of U.S. Patent Nos. 7,647,427 and 7,716,370 [Filed Under Seal]; and (3) Opposition to Defendants' Motion for Summary Judgment of Non-Infringement of U.S. Patent No. 7,558,195 [Filed Under Seal] filed by Brocade Communications Systems, Inc., Foundry Networks, LLC, filed Nov. 8, 2011, 136 pages. Included: Exhibits D, F, G, H, I, L, and M.

Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel filed by A10 Networks, Inc., Lee Chen, Rajkumar Jalan, Ron Szeto, filed Nov. 8, 2011, 17 pages.

Civil Action CV10-03428—Responsive Claim-Construction Brief (PLR 4-5(b)) by A10 Networks, Inc., Lee Chen, Rajkumar Jalan, filed Nov. 15, 2011, 28 pages.

Civil Action CV10-03428—Declaration of Scott R. Mosko in Support of Defendant and Counterclaimant A10 Networks, Inc.'s and Defendants Lee Chen's and Rajkumar Jalan's Responsive Claim

(56) References Cited

OTHER PUBLICATIONS

Construction Brief (PLR 4-5(b)) filed by A10 Networks, Inc., Lee Chen, Rajkumar Jalan, filed Nov. 15, 2011, 70 pages.
Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Administrative Motion to Consider Whether Cases Should be Related, filed by Brocade Communications Systems, Inc., Foundry Networks, LLC, filed Nov. 21, 2011, 8 pages, including Declaration and Proposed Order.
Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages including Exhibit A.
Civil Action CV10-03428—Reply in Support of Motion for Summary Judgment of Noninfringement of U.S. Patent No. 7,558,195 filed by A10 Networks, Inc., Lee Chen, Rajkumar Jalan, filed Nov. 22, 2011, 11 pages.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages, with exhibits 1-6.
Civil Action CV10-03428—Litigation Docket, printed on Nov. 26, 2011, 44 pages.
Non-Final Office Action for U.S. Appl. No. 10/216,946, mailed on Jul. 26, 2011, 11 pages.
Terminal Disclaimer for U.S. Appl. No. 11/695,458, filed Apr. 1, 2009, 1 page.
Advisory Action in Ex Parte Reexamination for Control No. 90/011,771 mailed Feb. 19, 2013, 12 pages.
Action Closing Prosecution in Inter Partes Reexamination for Control No. 95/001,815, mailed Dec. 19, 2012, 34 pages.
Nonfinal Office Action for U.S. Appl. No. 13/185,885, mailed Mar. 4, 2013, 7 pages.
Notice of Allowance for U.S. Appl. No. 10/261,946, mailed Feb. 20, 2013, 17 pages.
Notice of Allowance for U.S. Appl. No. 13/185,885, mailed on Oct. 9, 2013, 20 pages.
Civil Action CV10-03428—Stipulation Regarding Plaintiffs' Motion for Partial Summary Judgement of Assignor Estoppel, filed Nov. 30, 2011, 2 pages.
Civil Action CV10-03428—Brocade's Opposition to Defendant's Motion to Stay Proceedings Pending Reexaminations, filed Dec. 7, 2011, 18 pages.
Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Parted Reexaminations (All Patents Asserted by Plaintiffs). Filed Dec. 14, 2011, 11 pages.
Civil Action CV10-03428—Stipulation Regarding Parties' Proposed Claim Constructions, filed Dec. 19, 2011, 6 pages.
Civil Action CV10-03428—Declaration of Izhak Rubin in Support of Brocade Communications Systems, Inc.'s and Foundry Networks LLC's: (1) Claim Construction Brief; (2) Opposition to Defendants' Motion for Summary Judgement of Non-Infringement of U.S. Patent Nos. 7,647,427 and 7,716,370; and (3) Opposition to Defendants' Motion for Summary Judgement of Non-Infringement of U.S. Patent No. 7,558,195, filed Dec. 22, 2011, 34 pages.
Civil Action CV10-03428—Defendant and Counterclaimant A10 Networks, Inc.'s Notice of Granted Requests for Inter Partes Reexamination of Plaintiffs U.S. Patent Nos. 7,558,195; 7,454,500; 7,574,508; and 7,720,977, filed Dec. 28, 2011, 3 pages.
Civil Action CV10-03428—Order Construing Disputed Claim Terms of U.S. Patent Nos. 7,647,427; 7,716,370; 7,558,195; 7,454,500; 7,581,009; 7,657,629; 7,584,301; 7,840,678; and 5,875,185, filed Jan. 6, 2012, 33 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 4 pages.
Civil Action CV10-03428—Order Granting Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,558,195; and 7,774,833, filed Jun. 18, 2012, 20 pages.
Civil Action CV10-03428—Declaration of Siddhartha M. Venkatesan in Support of Opposition to Motion to Stay Proceedings Pending Reexaminations, filed Dec. 7, 2011, 3 pages.
Civil Action CV10-03428—Declaration of Azer Bestavros in Support of Brocade's Claim Construction Brief, filed Dec. 16, 2011, 24 pages.
Civil Action CV10-03428—Order by Judge Lucy H. Koh Denying A10's Motion for Summary Judgment of NonInfringement; Granting Brocade's Motion for Summary Judgment of NonInfringement, issued Jan. 6, 2012, 20 pages.
Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.
Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.
Civil Action CV10-03428—Order by Hon. Lucy H. Koh granting Motion for Leave to File "Notice of Activity Before the Patent Office From the Ongoing Inter Partes and Ex Parte Reexaminations of the Asserted Brocade Patents," issued Mar. 15, 2012, 5 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Motion for Summary Judgment, filed Apr. 13, 2012, 227 pages.
Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,55,195; and 7,774,833, filed May 3, 2012, 23 pages.
Civil Action CV10-03428—Exhibit 17 to Declaration of Scott R. Mosko in Support of Defendants A10 Networks, Inc.'s, Lee Chen's, Rajkumar Jalan's, Ron Szeto's and Steve Hwang's Motion for Summary Judgment, filed May 4, 2012, 25 pages.
Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.
Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.
Civil Action CV10-03428—Plaintiffs Objections to Declarations Submitted by A10 Networks, Inc., Lee Chen, Rajkumar Jalan, Ron Szeto and Steve Hwang in Support of Their Motion for Partial Summary Judgment, filed May 17, 2012, 3 pages.

(56) References Cited

OTHER PUBLICATIONS

Civil Action CV10-03428—Declaration of Elizabeth C. McBride in Support of Plaintiffs Brocade Communications Systems, Inc.'s and Foundry Networks, LLC's Opposition to Defendants'Motion for Summary Judgment, filed May 17, 2012, 135 pages.
Civil Action CV10-03428—Declaration of Gary Hemminger in Support of Brocade Communications Systems, Inc.'s and Foundry Networks, LLC's Opposition to Defendants A10 Networks, Inc.'s, Lee Chen's, Rajkumar Jalan's, Ron Szeto's and Steve Hwang's Motion for Summary Judgment, filed May 17, 2012, 3 pages.
Civil Action CV10-03428—Defendants A10 Networks, Inc.'s, Lee Chen's, Rajkumar Jalan's, Ron Szeto's and Steve Hwang's Opposition to Plaintiffs Motion for Partial Summary Judgment Dismissing Invalidity Declaratory Relief Counterclaim and Invalidity Defense Regarding U.S. Patent Nos. 7,454,500; 7,581,009; 7,558,195; and 7,774,833, filed May 17, 2012, 30 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiffs Motion for Partial Summary Judgment Dismissing Invalidity Declaratory Relief Counterclaim and Invalidity Defense Regarding U.S. Patent Nos. 7,454,500; 7,581,009; 7,558,195; and 7,774,833, filed May 17, 2012, 13 pages.
Civil Action CV10-03428—Order Granting in Part and Denying in Part A10's Motion for Summary Judgment, Jun. 12, 2012, 36 pages.
Civil Action CV10-03428—Defendant and Counterclaimant A10 Network, Inc.'s Amended Supplemental Claim Construction Brief, filed Jul. 2, 2012, 9 pages.
Civil Action CV10-03428—Plaintiffs Supplemental Claim Construction Brief, with Declarations of Azer Bestravros and Izhak Rubin, filed Jul. 3, 2012, 8 pages.
Civil Action CV10-03428—Further Claim Construction Order, Jul. 5, 2012, 4 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Civil Action CV10-03428, Transcript of the Deposition of Kevin Delgadillo, taken Mar. 14, 2012, 12 pages.

Third Party Requester's Opposition to Petition to Expunge Third Party Comments and Vacate the Action Closing Prosecution in Inter Partes Reexamination for Control No. 95/001,815 dated Mar. 5, 2013, 9 pages.
Third Party Requester's Comments to the Owners Response to the Action Closing Prosecution in Inter Partes Reexamination for Control No. 95/001,815, dated Mar. 21, 2013, 33 pages.
Examiners Answer to Appeal Brief for Control No. 90/011,771 dated Mar. 25, 2013, 15 pages.
"Patent Owner's Reply Brief for Control No. 90/011,771 dated May 28, 2013, 12 pages.".
"Patent Owner's Notice of Litigation for Control No. 90/011,771 dated Aug. 14, 2013, 2 pages.".
Right of Appeal Notice for Control No. 95/001,815 dated May 24, 2013, 35 pages.
Notice of Withdrawal of Third Party Requester A10 Networks, Inc. for Control No. 95/001,815 dated Jun. 13, 2013, 2 pages.
Patent Owner's Notice of Appeal for Control No. 95/001,815 dated Jun. 24, 2013, 2 pages.
Decision on Petition for Reconsideration of Sep. 10, 2012 Decision for Control No. 95/001,815 dated Jul. 1, 2013, 23 pages.
Decision Dismissing Petition to Expunge Comments and Action Closing Prosecution for Contol No. 95/001,815 dated Jul. 10, 2013, 8 pages.
Patent Owner's Petition Under 37 CFR 1.182 to Terminate the Reexamination Proceedings for Control No. 95/001,815 dated Jul. 10, 2013, 8 pages.
Patent Owner's Notice of Litigation for Control No. 90/011,771 dated Aug. 14, 2013, 2 pages.
Patent Owner's Appeal Brief for Control No. 951001,815 dated Aug. 26, 2013, 36 pages.
Decision Dismissing Patent Owner's Petition to Terminate Inter Partes Reexamination Proceeding, dated Aug. 30, 2013, 9 pages.
Notice of Allowance for U.S. Appl. No. 13/185,885, mailed Jun. 24, 2013, 11 pages.
Patent Board Decision for Control No. 90/011,771 mailed Nov. 22, 2013; 39 pages.
Examiner's Answer to Appeal Brief for Control No. 95/001,815, mailed Dec. 17, 2013; 19 pages.

* cited by examiner

TECHNIQUES FOR LINK REDUNDANCY IN LAYER 2 NETWORKS

CROSS-REFERENCES TO RELATED APPLICATIONS

The present application claims the benefit and priority under 35 U.S.C. 119(e) of U.S. Provisional Application No. 61/315,889, filed Mar. 19, 2010 and entitled "METHOD AND APPARATUS FOR LINK REDUNDANCY IN VIRTUAL SWITCH REDUNDANCY PROTOCOL," the entire contents of which are incorporated herein by reference for all purposes.

The present application also incorporates by reference for all purposes the entire contents of the following commonly-assigned U.S. patents and applications:

U.S. Pat. No. 7,209,435, issued Apr. 24, 2007 and entitled "SYSTEM AND METHOD FOR PROVIDING NETWORK ROUTE REDUNDANCY ACROSS LAYER 2 DEVICES;"

U.S. Pat. No. 7,558,195, issued Jul. 7, 2009 and entitled "SYSTEM AND METHOD FOR PROVIDING NETWORK ROUTE REDUNDANCY ACROSS LAYER 2 DEVICES;" and U.S. Pat. No. 8,014,301, issued Sep. 6, 2011 and entitled "SYSTEM AND METHOD FOR PROVIDING NETWORK ROUTE REDUNDANCY ACROSS LAYER 2 DEVICES".

BACKGROUND OF THE INVENTION

The present disclosure relates in general to computer networking, and in particular to techniques for facilitating link redundancy in Layer 2 networks.

Virtual Switch Redundancy Protocol (VSRP) is a network protocol that allows for failover between redundant Layer 2 and/or Layer 2/3 devices (referred to herein as switches) in a loop-free Layer 2 network. In particular, VSRP enables a group of switches to act in concert as a single, virtual switch. One switch in the group (the VSRP master switch) can operate in a master mode in which the switch actively forwards data traffic on all ports connected to the Layer 2 network. Other switches in the group (the VSRP backup switches) can operate in a backup mode or master confirm mode in which the switches block data traffic on all ports connected to the Layer 2 network. The determination of which switch should act as the master and which switches should act as backups can be based on priority values that are derived from various criteria.

When the VSRP master switch experiences a failure or otherwise becomes unavailable, one of the VSRP backup switches can determine that it has the highest priority value and can automatically transition from backup/master confirm mode to master mode, thereby taking over switching functionality from the failed master. The features of VSRP are discussed in greater detail in the following U.S. patents and patent applications, the entire contents of which are incorporated herein by reference for all purposes: U.S. Pat. No. 7,209,435, issued Apr. 24, 2007 and entitled "SYSTEM AND METHOD FOR PROVIDING NETWORK ROUTE REDUNDANCY ACROSS LAYER 2 DEVICES;" U.S. Pat. No. 7,558,195, issued Jul. 7, 2009 and entitled "SYSTEM AND METHOD FOR PROVIDING NETWORK ROUTE REDUNDANCY ACROSS LAYER 2 DEVICES;" and U.S. patent application Ser. No. 12/477,069, filed Dec. 3, 2009 and entitled "SYSTEM AND METHOD FOR PROVIDING NETWORK ROUTE REDUNDANCY ACROSS LAYER 2 DEVICES"

One shortcoming with current implementations of VSRP is that redundancy is generally limited to the switch level. As a result, VSRP cannot adequately address failures that may occur at the network link level. Consider the network topology depicted in FIG. 1. As shown, a VSRP master switch 102 and a VSRP backup switch 104 (which are configured to act in concert as a VSRP virtual switch 106) are communicatively coupled with VSRP-aware switches 108, 110 via links 112, 114, 116, 118 and with a wide area network (WAN) 120. Per conventional VSRP functionality, VSRP master switch 102 is configured to forward data traffic on ports 122, 124 connected to links 112, 114 and VSRP backup switch 104 is configured to block data traffic on ports 126, 128 connected to links 116, 118. If VSRP master switch 102 fails, VSRP backup switch 104 can transition to master mode and begin forwarding data traffic on ports 126, 128, thereby taking over switching functionality from 102.

However, if a failure occurs with respect to one or more links 112, 114, 116, 118, a situation can occur where VSRP switches 102 and 104 cannot properly forward all data traffic. For example, consider a situation where link 114 fails, but where the priority value of switch 102 remains higher than the priority value of switch 104 (thus preventing switch 104 from transitioning to master mode). In this case, VSRP switch 102 will continue operating in master mode, but will not have a working connection to VSRP-aware switch 110. Accordingly, data communication with VSRP-aware switch 110 will be lost.

BRIEF SUMMARY OF THE INVENTION

Embodiments of the present invention provide techniques for facilitating link redundancy in a loop-free Layer 2 network using an enhanced version of Virtual Switch Redundancy Protocol (VSRP), referred to herein as VSRP2. In one set of embodiments, a group of Layer 2 and/or Layer 2/3 devices (switches) can act in concert as a VSRP2 virtual switch. A first switch in the group (a VSRP2 master switch) can forward, via a first link, data traffic to/from a network device in a connected Layer 2 network. A second switch in the group (a VSRP2 backup switch) can block, at a second link, data traffic to/from the same network device. If the first link fails or otherwise becomes unavailable, the VSRP2 backup switch can detect the link failure and begin forwarding, via the second link, data traffic to/from the network device. The VSRP2 backup switch can also transmit, via the second link, a control packet to the network device indicating that the second link is now active. In this manner, redundancy can be provided at the link level between the VSRP2 virtual switch and the Layer 2 network.

According to an embodiment of the present invention, a switch is provided that is configured for use in a system of switches, the system of switches acting as a virtual switch. The switch includes a processor and a plurality of ports for communicatively coupling the switch to a network. In a particular embodiment, the switch is configured to act in concert with one or more other switches in the system of switches to provide link redundancy for the network.

In one embodiment, the network is a Layer 2 network or a Layer 3 network.

In one embodiment, the network is a loop-free network.

In one embodiment, the plurality of ports include a first port for communicatively coupling the switch to a first device in the network. In addition, the processor is configured to determine whether a network link between the first device and another switch in the system of switches is unavailable, and if the network link is unavailable, set the first port to forward data traffic.

In one embodiment, the processor is further configured to set the first port to block data traffic prior to performing the determining step.

In one embodiment, if the network link is unavailable, the processor is further configured to transmit a first type of control packet to the first device, the first type of control packet indicating that the first port has been set to forward data traffic. In another embodiment, the processor is further configured to retransmit the first type of control packet to the first device at a predefined time interval.

In one embodiment, the determining includes initializing a counter for the first port and, if the counter expires before receiving a second type of control packet on the first port, determining that the network link is unavailable.

In one embodiment, the determining further includes, if the second type of control packet is received on the first port before the counter expires, determining whether a first priority value included in the second type of control packet is greater than a second priority value stored by the switch, and if the first priority value is greater than the second priority value, determining that the network link is available.

In one embodiment, switches in the system of switches are configured to communicate their status to each other via the second type of control packet.

In one embodiment, the processor is further configured to, subsequently to setting the first port to forward data traffic, receive the second type of data packet on the first port, initialize another counter for the first port, and when the another counter expires, reset the first port to block data traffic.

In one embodiment, the first type of control packet is a VSRP2 hello packet. In another embodiment, the second type of control packet is a VSRP hello packet.

In one embodiment, the switch is configured to provide both Layer 2 switching and Layer 3 routing functionality.

In one embodiment, the plurality of ports further include a second port dedicated for communication with the another switch.

According to another embodiment of the present invention, a switch is provided that is configured for use in a system of switches, the system of switches acting as a virtual switch. The switch includes a first port for communicatively coupling the switch to a first device in a Layer 2 network, and a second port for communicatively coupling the switch to a second device in the Layer 2 network. The switch further includes a processor configured to set the first port and the second port to a blocking state, determine whether a network link between the first device and another switch in the system of switches is unavailable, and if the network link is unavailable, set the first port to a forwarding state while keeping the second port in the blocking state. In a particular embodiment, the switch is configured to act in concert with the another switch to provide route redundancy for the Layer 2 network.

According to another embodiment of the present invention, a method is provided that comprises setting, by a switch, a port of the switch to block data traffic, where the port is configured to communicatively couple the switch to a device in a Layer 2 network, and where the switch is configured for use in a system of switches, the system of switches acting as a virtual switch. The method further comprises determining, by the switch, whether a network link between the device and another switch in the system of switches is unavailable. If the network link is unavailable, the port is set to forward data traffic.

According to another embodiment of the present invention, a network device is provided that includes a first port for communicatively coupling the network device to a first redundant switch in a system of redundant switches, and a second port for communicatively coupling the network device to a second redundant switch in the system of redundant switches. The network device further includes a processor configured to forward data traffic through the first port without forwarding data traffic through the second port, and receive a first type of control packet on the second port, the first type of control packet indicating that future data traffic should be forwarded through the second port. In response to receiving the first type of control packet, the processor is configured to modify a forwarding database of the network device to cause a MAC address associated with the first port to be associated with the second port.

In one embodiment, the first redundant switch and the second redundant switch are configured to act in concert as a VSRP2 virtual switch.

In one embodiment, the processor is further configured to, subsequently to modifying the forwarding database to forward data traffic through the second port, receive a second type of control packet on the first port, forward the second type of control packet through the second port, and modify the forwarding database to cause a MAC address associated with the second port to be associated with the first port.

In one embodiment, the second type of data packet is a VSRP hello packet.

A further understanding of the nature and advantages of the embodiments disclosed herein can be realized by reference to the remaining portions of the specification and the attached drawings.

DETAILED DESCRIPTION OF THE INVENTION

In the following description, for the purposes of explanation, specific details are set forth in order to provide a thorough understanding of embodiments of the invention. However, it will be apparent that the invention can be practiced without these specific details.

Embodiments of the present invention provide techniques for facilitating link redundancy in a loop-free Layer 2 network using an enhanced version of Virtual Switch Redundancy Protocol (VSRP), referred to herein as VSRP2. In one set of embodiments, a group of Layer 2 and/or Layer 2/3 devices (switches) can act in concert as a VSRP2 virtual switch. A first switch in the group (a VSRP2 master switch) can forward, via a first link, data traffic to/from a network device in a connected Layer 2 network. A second switch in the group (a VSRP2 backup switch) can block, at a second link, data traffic to/from the same network device. If the first link fails or otherwise becomes unavailable, the VSRP2 backup switch can detect the link failure and begin forwarding, via the second link, data traffic to/from the network device. The VSRP2 backup switch can also transmit, via the second link, a control packet to the network device indicating that the second link is now active. In this manner, redundancy can be provided at the link level between the VSRP2 virtual switch and the Layer 2 network.

Figure 1:
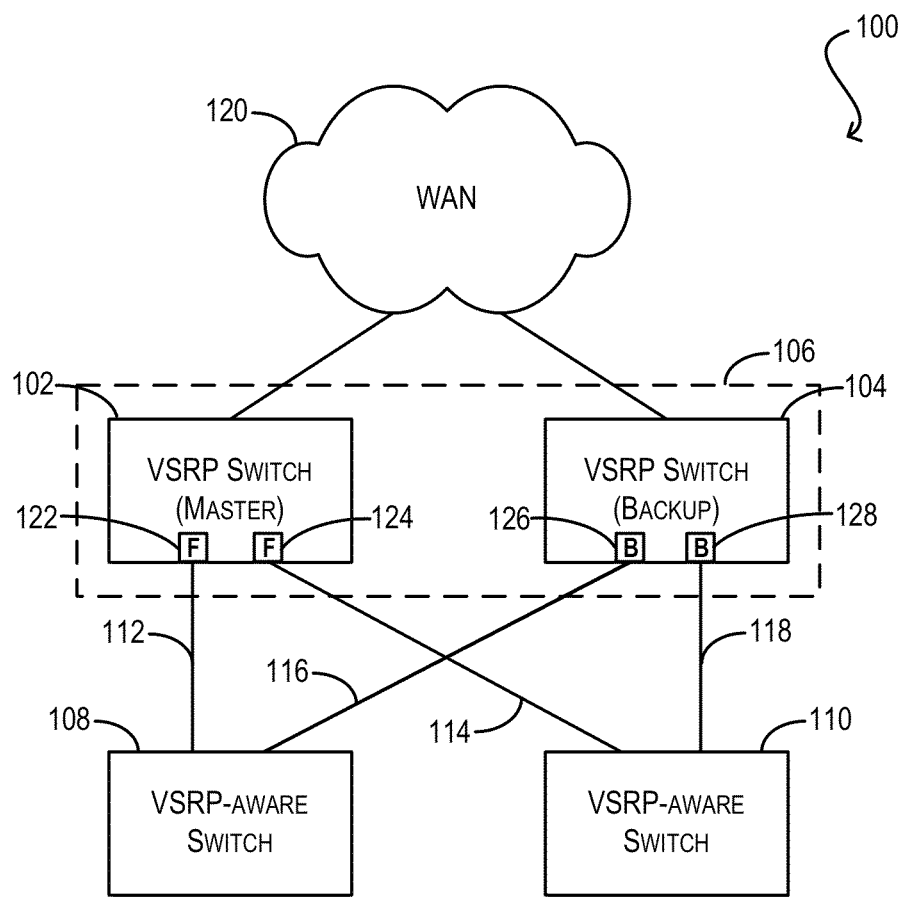
FIG. 1 is a simplified block diagram of a network topology including a VSRP virtual switch.
Figure 2A:
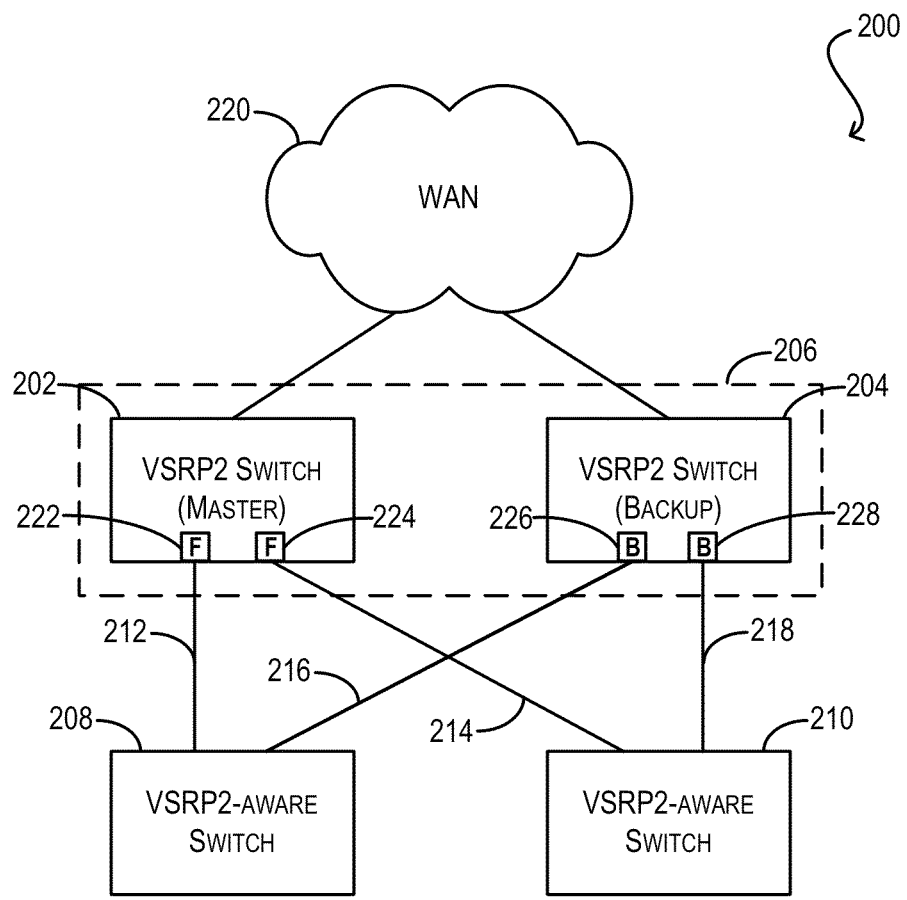
FIGS. 2A-2C are simplified block diagrams of a network topology including a VSRP2 virtual switch in accordance with embodiments of the present invention.
Figure 2B:
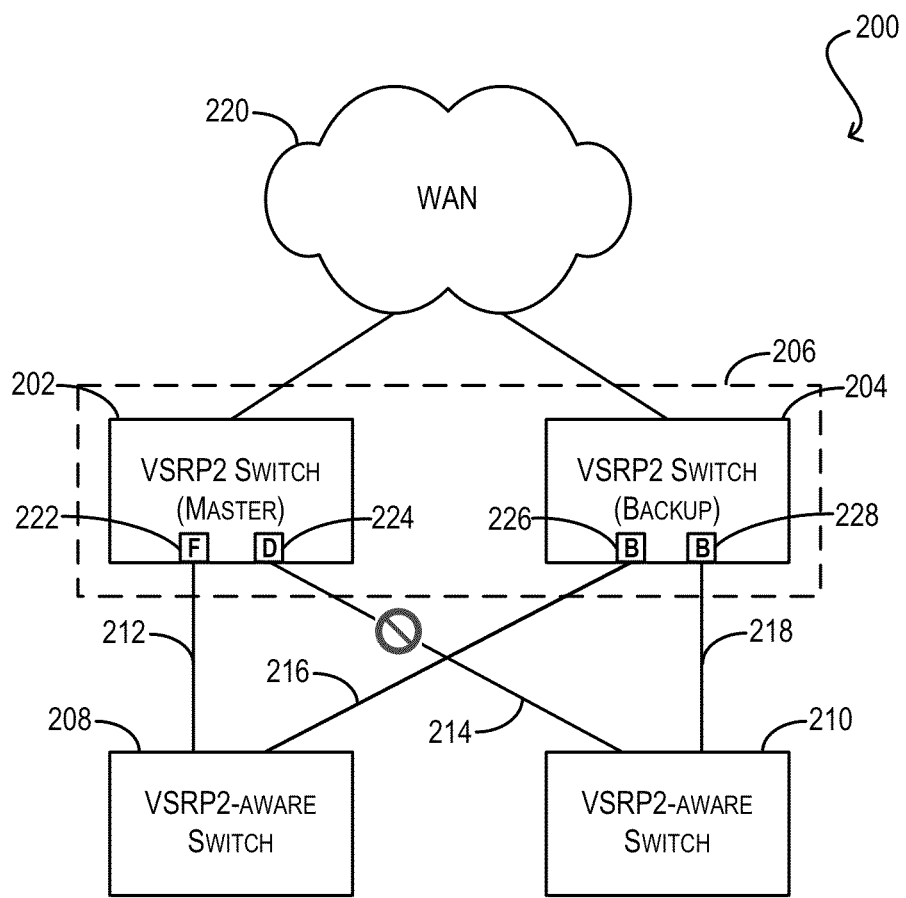

FIG. 2A is a simplified block diagram of a network topology 200 according to an embodiment of the present invention. As shown, network topology 200 includes a VSRP2 master switch 202 and a VSRP2 backup switch 204 that are configured to act in concert as a single VSRP2 virtual switch 206. VSRP2 switches 202, 204 are symmetrically coupled with VSRP2-aware switches 208, 210 via network links 212, 214, 216, 218. In addition, VSRP2 switches 202, 204 are coupled with a wide area network (WAN) 220. Although FIG. 2 depicts two VSRP2 switches and two VSRP2-aware switches, any number of such devices can be supported.

VSRP2 switches 202, 204 can provide Layer 2 switching of data traffic traveling between VSRP2-aware switches 208, 210 and WAN 220. In certain embodiments, VSRP2 switches 202, 204 can also provide Layer 3 routing functionality. In the embodiment of FIG. 2A, switches 202, 204 are labeled as VSRP2 switches because they are configured to interoperate using an enhanced version of VSRP, referred to herein as VSRP2.

VSRP2 is similar to VSRP in that it enables implementing switches to act in concert as a single virtual switch to provide switch redundancy for a connected Layer 2 network. In particular, VSRP2 switches (like VSRP switches) can communicate their status to each other via control packets (referred to herein as VSRP hello packets) and, based on that communication, can operate in one of several modes—master mode, backup mode, and master confirm mode. In master mode, a VSRP2 switch can forward data traffic on all ports connected to a Layer 2 network. In backup mode, a VSRP2 switch can block data traffic (but allow control packet traffic) on all ports connected to the Layer 2 network. And in master confirm mode, a VSRP2 switch can block data traffic in manner similar to backup mode, but also transmit VSRP hello packets to other switches in the virtual switch to determine whether to transition to master mode. By transitioning between these various modes, the VSRP2 switches in a virtual switch can redundantly support each other in the case of a switch failure.

For example, as shown in FIG. 2A, VSRP2 master switch 202 can operate in master mode and thus forward data traffic on ports 222, 224 connected to VSRP2-aware switches 208, 210 via links 212, 214 respectively (illustrated by the designation "F"). VSRP2 backup switch 204 can operate in backup (or master confirm) mode and thus block data traffic on ports 226, 228 connected to VSRP2-aware switches 208, 210 via links 216, 218 respectively (illustrated by the designation "B"). If VSRP2 master switch 202 experiences a failure or otherwise becomes unavailable, VSRP 2 backup switch 204 can automatically transition from backup or master confirm mode to master mode and begin forwarding data traffic on ports 226, 228, thereby take over switching functionality from switch 202. The processing performed by VSRP2 switches 202, 204 in backup, master confirm, and master modes is described in greater detail with respect to FIGS. 4-6 below.

As noted in the Background section, one shortcoming with current implementations of VSRP is that they cannot handle certain failures that occur at the network link level. Consider the situation shown in FIG. 2B where link 214 fails or otherwise becomes unavailable and port 224 becomes disabled (illustrated by the designation "D"). In this scenario, if the priority value of VSRP2 master switch 202 remains higher than the priority value of VSRP2 backup switch 204 (thus preventing switch 204 from transitioning to master mode), switch 202 will continue operating as the master. However, since link 214 is down, switch 202 will not have a working connection to VSRP2-aware switch 210. Accordingly, data communication with VSRP2-aware switch 210 will be lost.

As another example, consider a situation (not shown) where links 214 and 216 fail concurrently, and where there is a direct link between VSRP2 switches 202 and 204 (for communicating VSRP control traffic). In this case, neither VSRP2 switch 202 nor 204 has working connections to both 208 and 210—VSRP2 switch 202 only has a working connection to VSRP2-aware switch 208 via port 222/link 212, and VSRP2 switch 204 only has a working connection to VSRP2-aware switch 210 via port 228/link 218. Thus, regardless of whether VSRP2 switch 202 or 204 acts as the master, data communication with one of the VSRP2-aware switches 208 or 210 will be lost.

VSRP2 addresses the foregoing by enhancing VSRP to support redundancy at the link (in addition to the switch) level. In various embodiments, VSRP2 switches can operate in (and transition between) the same backup, master confirm, and master modes as standard VSRP switches. However, VSRP2 switches can also perform additional processing in these modes to detect a link failure and provide redundant support for the failed link. For example, using VSRP2, VSRP2 backup switch 204 can detect (while in backup or master confirm mode) that link 214 between VSRP2 master switch 202 and VSRP2-aware switch 210 has failed. In response, VSRP2 backup switch 204 can automatically change the state of port 228 from blocking to forwarding and thus being forwarding data traffic to/from VSRP2 aware switch 210 via redundant link 218 (see FIG. 2C). This configuration can be maintained until, for example, link 214 is restored. At that point, VSRP2 backup switch 204 can once again set port 228 to block data traffic, thereby allowing VSRP2 master switch 202 to resume handling all switching duties via ports/links 222/212 and 224/214.

In one set of embodiments, VSRP2 can support all of the features of VSRP (e.g., switch redundancy, time-to-live (TTL) values, topology groups, VLAN groups, etc.) in addition to the link redundancy features that are unique to VSRP2. The processing performed by VSRP2 switches 202, 204 to support link redundancy is described in greater detail with respect to FIGS. 7, 9, and 10 below.

VSRP2-aware switches 208, 210, which are symmetrically coupled with VSRP2 switches 202, 204, can provide Layer 2 aggregation and switching functionality as part of a Layer 2 network. Although not shown in FIG. 2A, each switch 208 or 210 can be connected to one or more host devices, hubs, switches, bridges, or other network devices. Indeed, switches 208, 210 can be part of any arbitrary Layer 2 network topology. In a particular embodiment, the Layer 2 network encompassing switches 208, 210 can be configured to run a loop elimination protocol, such as Spanning Tree Protocol (STP), to avoid network loops.

As suggested by the label "VSRP2-aware," in one set of embodiments switches 208, 210 can be configured to recognize that switches 202, 204 implement VSRP2 and can operate in a manner that facilitates link failovers. For example, returning to the scenario shown in FIGS. 2B, 2C where link 214 goes down, VSRP2 backup switch 204 can transmit to VSRP2aware switch 210 via link 218 a type of control packet unique to VSRP2 (referred to herein as a VSRP2 hello packet). The VSRP2 hello packet (which is distinct from the VSRP hello packet described above) can indicate that port 228/link 218 has become active and is now forwarding data traffic. In response, VSRP2-aware switch 210 can recognize the VSRP2 hello packet and take appropriate steps to facilitate quick fail over from failed link 214 to redundant link 218. The processing performed by VSRP2-aware switches 208, 210 is described in greater detail with respect to FIGS. 8 and 11 below.

In some embodiments, switches 208, 210 may not be VSRP2-aware; for example, switches 208, 210 can be prior art switches that do not have any knowledge of VSRP2. In these embodiments, link redundancy can still be enabled by implementing VSRP2 in switches 202, 204. However, the amount of time it takes for switches 208, 210 to re-route data traffic from a failed link to a redundant link (e.g., from failed link 214 to redundant link 218) may be greater than embodiments in which switches 208, 210 are VSRP2-aware.

It should be appreciated that network topology 200 is illustrative and not intended to limit embodiments of the present invention. For example, the various entities depicted in topology 200 can have other capabilities or include other components that are not specifically described. One of ordinary skill in the art will recognize other variations, modifications, and alternatives.

Figure 2C:
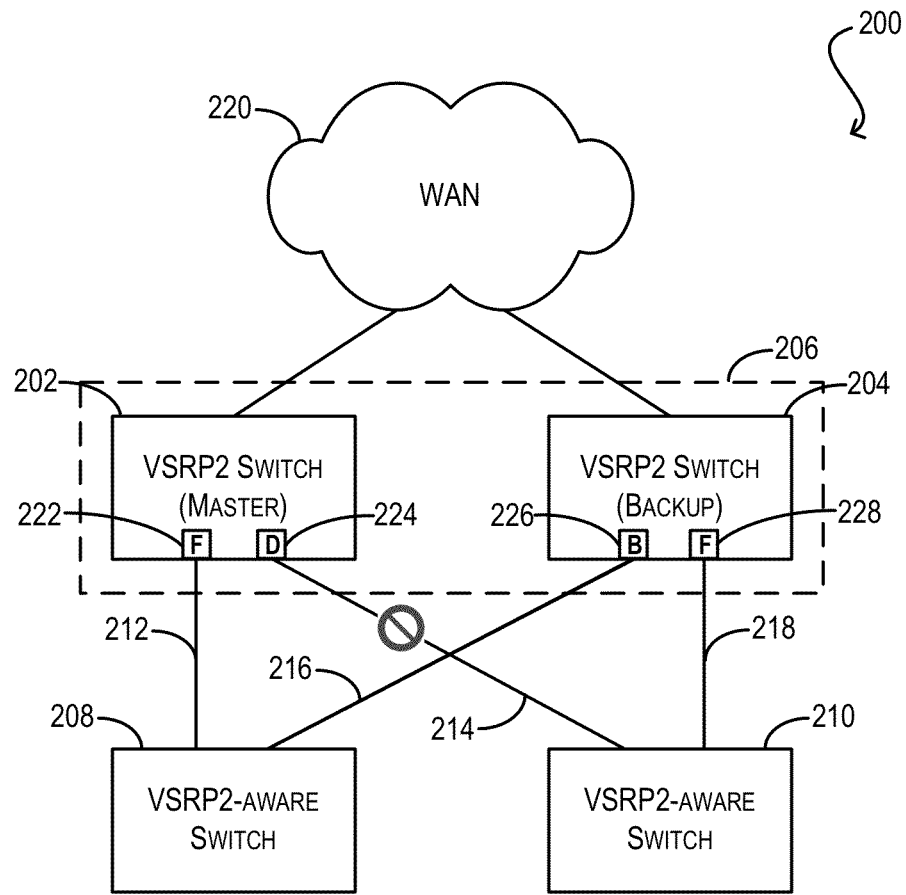
Figure 3:
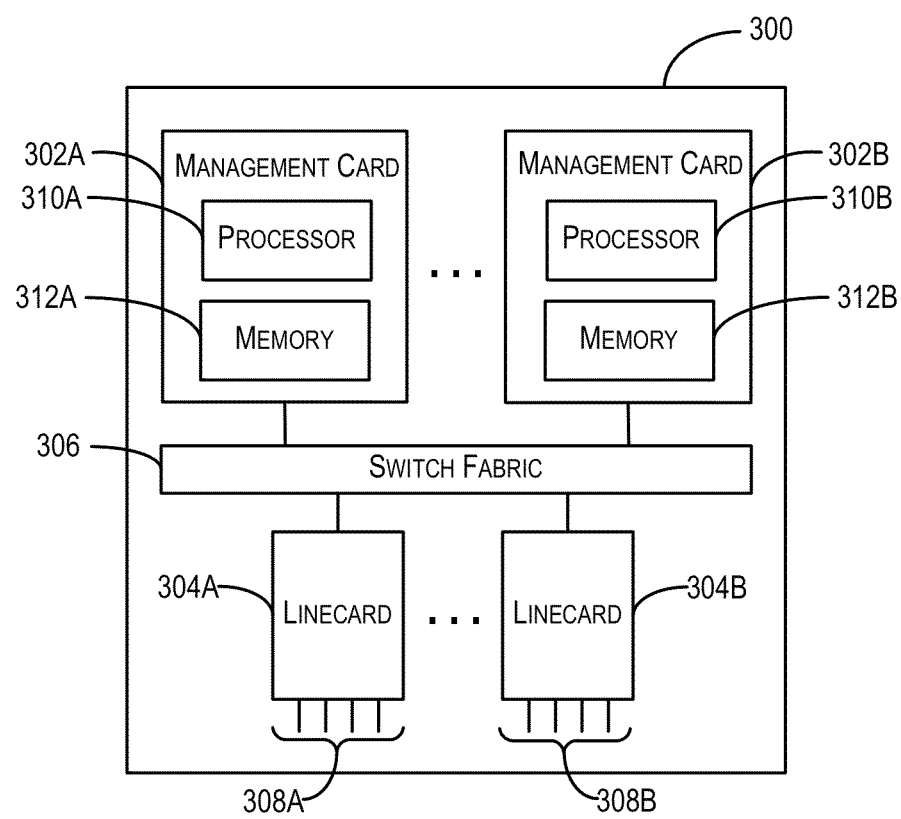
FIG. 3 is a simplified block diagram of a Layer 2 or Layer 2/3 network device in accordance with an embodiment of the present invention.

FIG. 3 is a simplified block diagram of a network switch 300 according to an embodiment of the present invention. Switch 300 can be used to implement any of the switches 202, 204, 208, 210 illustrated in FIGS. 2A-2C. In one set of embodiments, switch 300 can be, e.g., an Edgelron switch available from Brocade Communications Systems, Inc.

As shown in FIG. 3, switch 300 can include one or more management cards 302A, 302B and one or more linecards 304A, 304B coupled via a switch fabric 306. Each management card/linecard 302A, 302B, 304A, 304B can be inserted into (or removed from) one of a plurality of modular slots in the chassis of switch 300. Accordingly, switch 300 can accommodate any number of management cards and linecards as needed for different network topologies and different switching/routing requirements.

Generally speaking, linecards 304A, 304B represent the data forwarding plane of switch 300. Each linecard 304A, 304B can include one or more input/output ports 308A, 308B that are used by switch 300 to send and receive data packets. Ports 308A, 308B can send and/or receive various types of data traffic at different speeds including 1 Gigabit/sec, 10 Gigabits/sec, or more.

Management cards 302A, 302B represent the control plane of switch 300. Each management card can include a management processor (e.g., 310A, 310B) that executes management and/or control functions of switch 100. In one set of embodiments, each management processor can be a general purpose microprocessor, such as a PowerPC, Intel, AMD, or ARM microprocessor, that operates under the control of software stored in a computer-readable storage medium (e.g., memories 312A, 312B). For example, the computer-readable storage medium can store program code which, when executed by management processor 310A or 310B, carries out the various link redundancy techniques described herein.

It should be appreciated that FIG. 3 is illustrative and not intended to limit embodiments of the present invention. For example, in one set of embodiments switch 300 can conform to a single-board design where ports 308A, 308B are directed coupled to one or more of processors 310A, 310B. In these embodiments, there is no need for separate line cards 304A, 304B and switch fabric 306. As another example, switch 300 can have other capabilities or include other components that are not specifically described. In certain embodiments, switch 300 can be a hybrid Layer 2/3 network device that provides both Layer 2 switching and Layer 3 routing functionality. One of ordinary skill in the art will recognize other variations, modifications, and alternatives.

Figure 4:
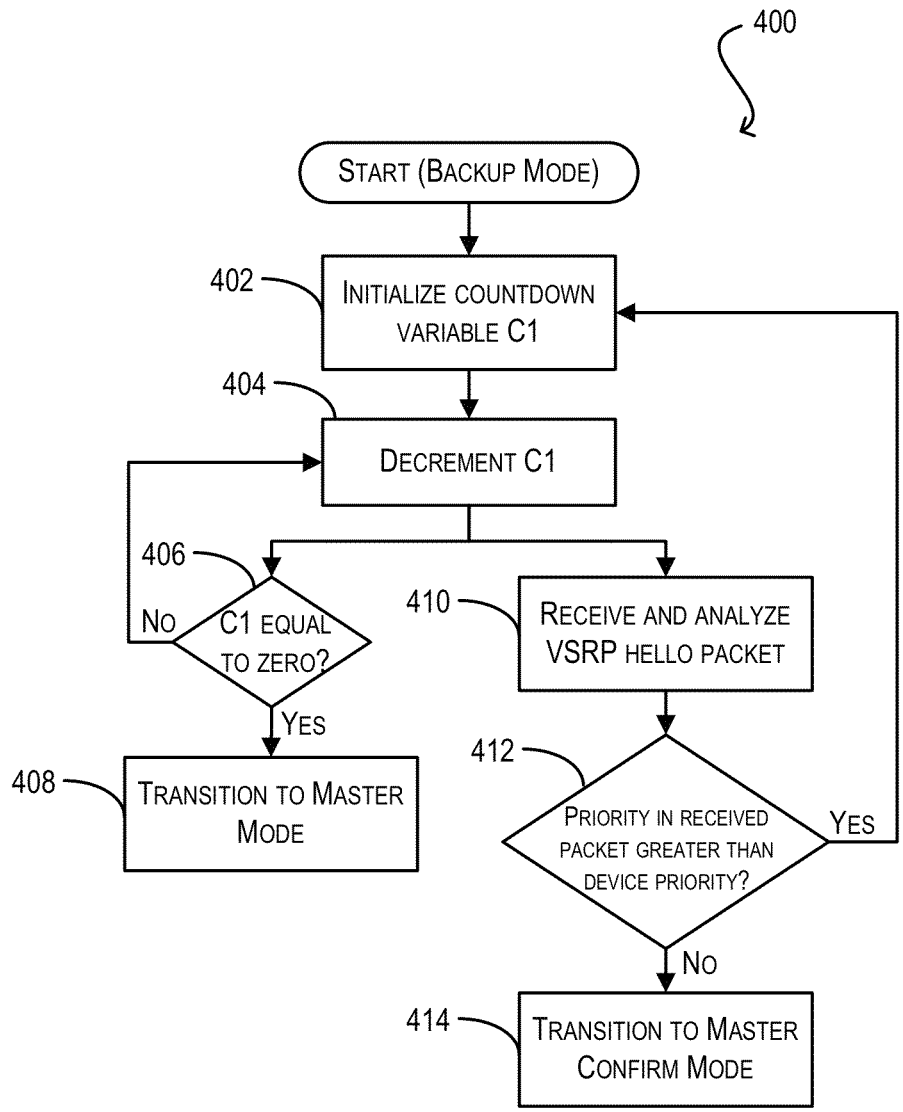
FIG. 4 is a flow diagram of a process performed by a VSRP2 switch in backup mode to facilitate switch redundancy in accordance with an embodiment of the present invention.
Figure 5:
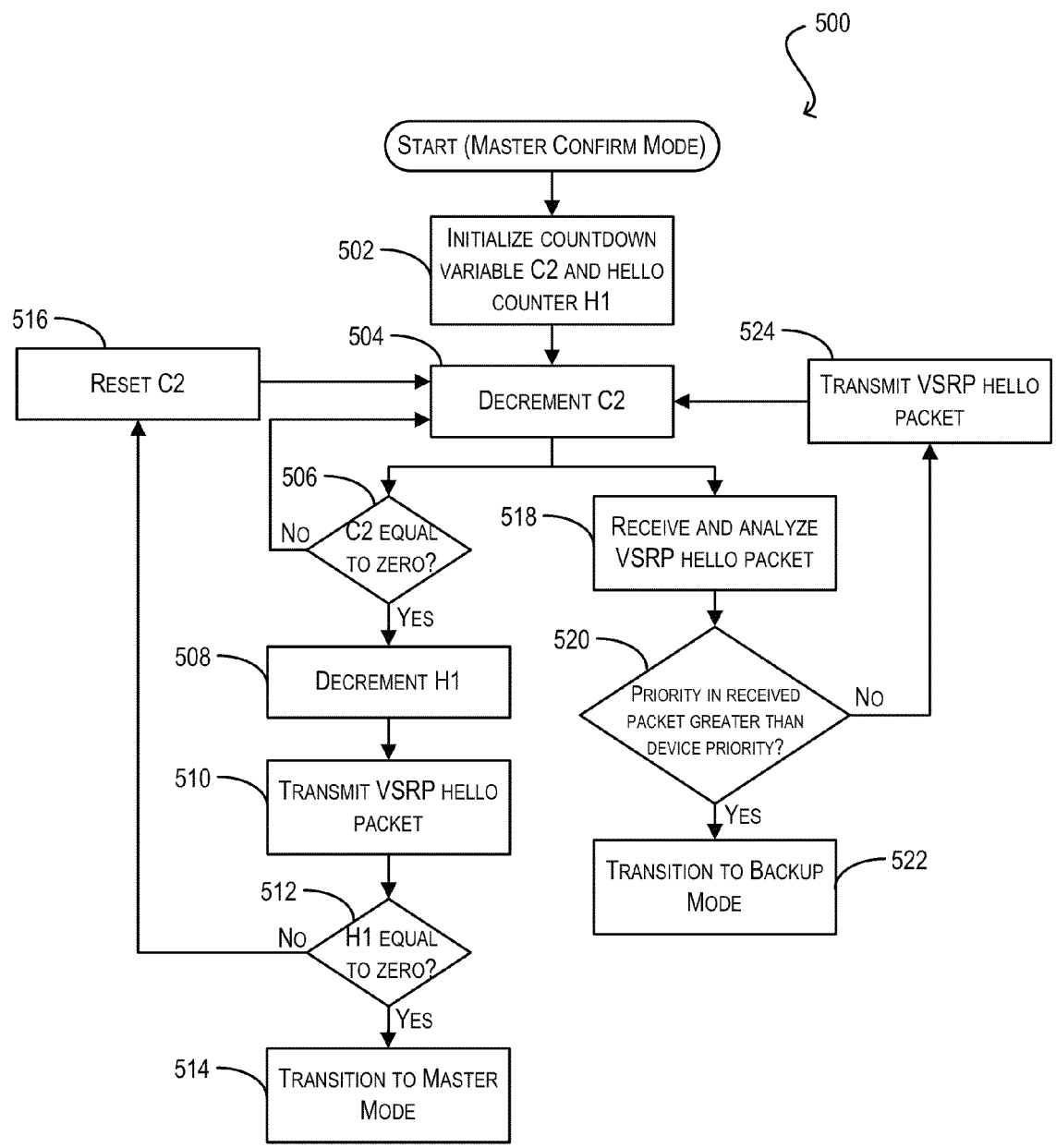
FIG. 5 is a flow diagram of a process performed by a VSRP2 switch in master confirm mode to facilitate switch redundancy in accordance with an embodiment of the present invention.
Figure 6:
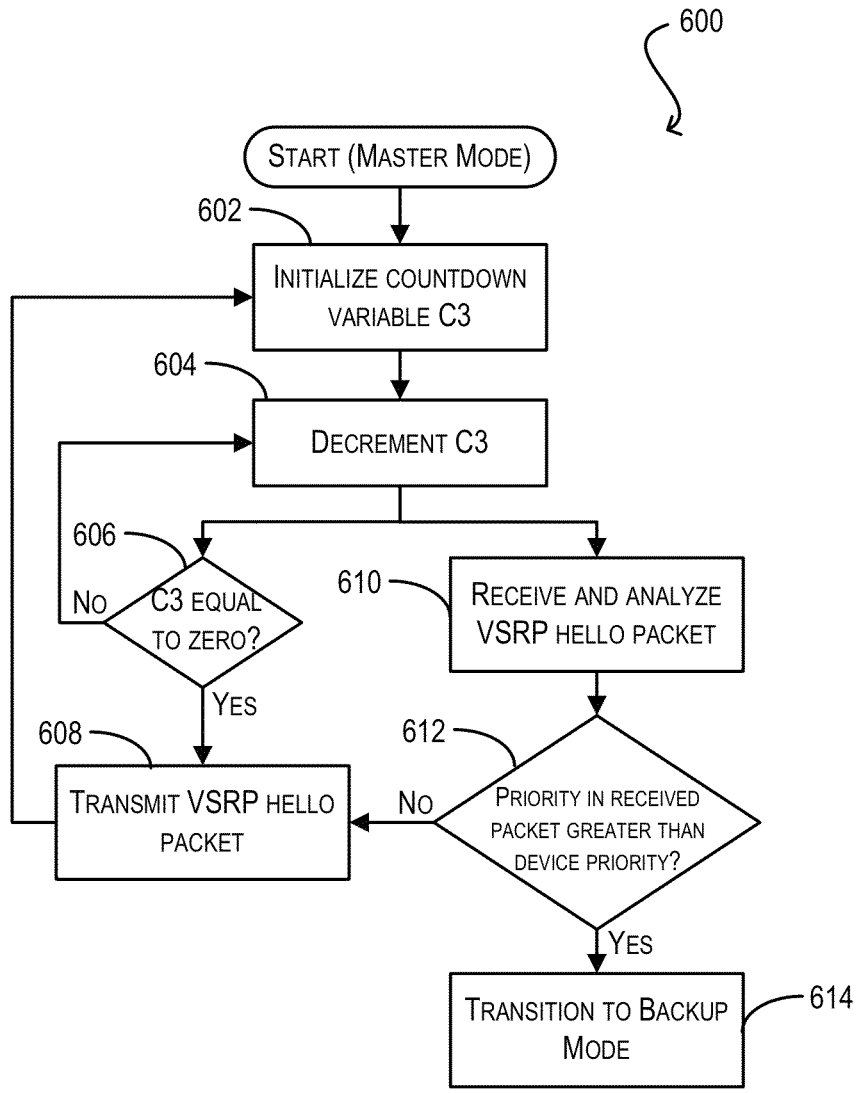
FIG. 6 is a flow diagram of a process performed by a VSRP2 switch in master mode to facilitate switch redundancy in accordance with an embodiment of the present invention.

As noted above, VSRP2 is similar to VSRP in that it enables implementing switches to act in concert as a single virtual switch to provide switch redundancy for a connected Layer 2 network. For example, VSRP2 switches (like VSRP switches) can communicate their status to each other via VSRP hello packets and, based on that communication, can operate in one of several switch redundancy modes—backup mode, master confirm mode, and master mode. FIGS. 4-6 illustrates processes performed by a VSRP2 switch when operating in these various modes. In particular, FIG. 4 illustrates a process 400 performed by a VSRP2 backup switch in backup mode, FIG. 5 illustrates a process 500 performed by VSRP2 backup switch in master confirm mode, and FIG. 6 illustrates a process 600 performed by VSRP2 master switch in master mode.

Figure 7:
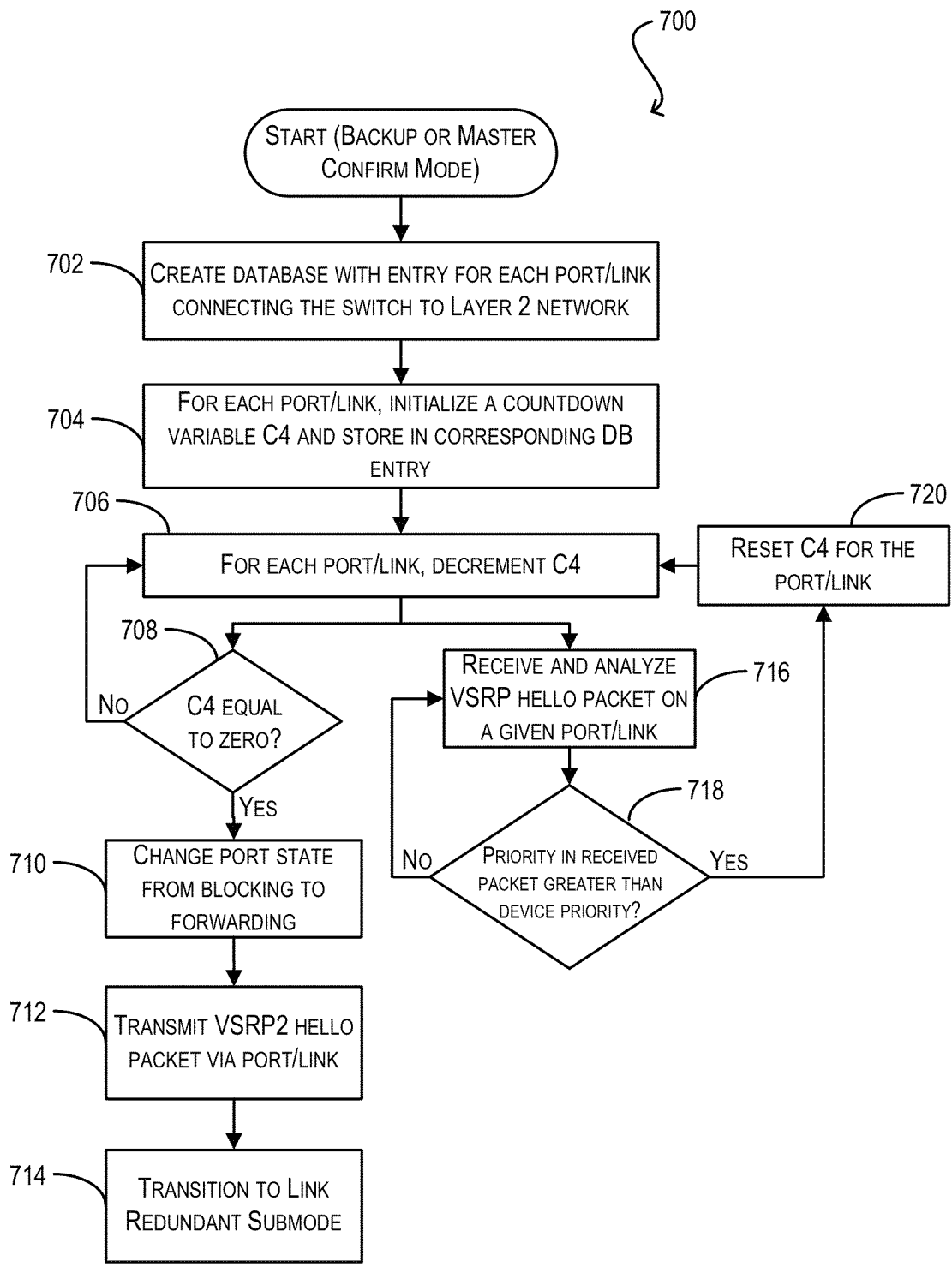
FIG. 7 is a flow diagram of a process performed by a VSRP2 switch in backup or master confirm mode to facilitate link redundancy in accordance with an embodiment of the present invention.

Processes 400-600 pertain only to the steps performed by a VSRP2 switch for facilitating switch redundancy (the steps for facilitating link redundancy are described with respect to FIGS. 7, 9, and 10 below). Accordingly, processes 400-600 are substantially similar to the processing performed by conventional VSRP switches. In one set of embodiments, processes 400 and 500 can be performed by VSRP2 backup switch 204 of FIG. 2A and process 600 can be performed by VSRP2 master switch 202 of FIG. 2A.

Referring to FIG. 4, process 400 begins with a VSRP2 switch (e.g., VSRP2 backup switch 204) operating in backup mode. Accordingly, the VSRP2 switch can be configured to set all of its to ports to a blocking state whereby only control packets are accepted; regular network traffic is denied. At blocks 402-406, the VSRP2 switch can initialize a countdown variable C1 and execute a countdown process that includes decrementing variable C1 and determining whether C1 has reached zero. If C1 reaches zero, the VSRP2 switch can transition to master mode (block 408). If C1 has not yet reached zero, the VSRP2 switch can continue decrementing C1.

In parallel with the countdown process of blocks 404-406, the VSRP2 switch can determine whether a specific type of control packet (i.e., a VSRP hello packet) is received from another VSRP2 switch in the same virtual switch. If no VSRP hello packet is received, the VSRP2 switch can continue decrementing C1 and checking whether C1 has reached zero according to blocks 404 and 406. If a VSRP hello packet is received, the VSRP2 switch can analyze the packet and determine whether a priority value included in the packet is greater than a priority value stored by the switch (blocks 410, 412). In various embodiments, the relative sizes of these priority values can indicate whether the VSRP2 switch should challenge other VSRP2 switches in a bid to become the new master switch (by transitioning to master confirm mode), or should continue operating in backup mode.

If the priority value in the received packet is greater than the stored priority value, countdown variable C1 can be reset and the flow of process 400 can be repeated. If the priority value in the received packet is less than the stored priority value, the VSRP2 switch can transition to master confirm mode (block 414). When this transition occurs, the parallel countdown process of blocks 404-406 can be terminated.

Referring now to FIG. 5, process 500 begins with a VSRP2 switch (e.g., VSRP2 backup switch 204) operating in master confirm mode. As with backup mode, the VSRP2 switch can be configured to set all of its to ports to a blocking state whereby only control packets are accepted; regular network traffic is denied.

At block 502, the VSRP2 switch can initialize a countdown variable C2 and a hello counter H1. At blocks 504-506, the VSRP2 switch can execute a countdown process that includes decrementing variable C2 and determining whether C2 has reached zero. If C2 has not yet reached zero, the VSRP2 switch can continue decrementing C2. If C2 reaches zero, the VSRP2 switch can decrement H1 and transmit a VSRP hello packet to other VSRP2 switches in the same virtual switch (e.g., VSRP2 master switch 202) (blocks 508, 510). In various embodiments, the transmitted packet can include the priority value of the VSRP2 switch. The VSRP2 switch can then determine whether H1 has reached zero (block 512). If H1 has not reached zero, variable C2 can be reset and the countdown process starting at block 504 can be repeated. In this manner, the VSRP2 switch can continue transmitting VSRP hello packets. If H1 reaches zero, the VSRP2 switch can transition to master mode (block 514).

In parallel with the countdown process of blocks 504-512, the VSRP2 switch can determine whether a VSRP hello packet is received from another VSRP2 switch in the same virtual switch. If no VSRP hello packet is received, the VSRP2 switch can continue decrementing C2 and checking whether C2 has reached zero according to blocks 504 and 506. If a VSRP hello packet is received, the VSRP2 switch can analyze the packet and determine whether a priority value included in the packet is greater than a priority value stored by the VSRP2 switch (blocks 518, 520).

If the priority value in the received packet is greater than the stored priority value, another VSRP2 switch in the virtual switch is likely a better candidate to act as the master. Accordingly, the VSRP2 switch can transition back to backup mode (block 522). When this transition occurs, the parallel countdown process of blocks 504-512 can be terminated. If the priority value in the received packet is less than the stored priority value, the VSRP2 switch can transmit a VSRP hello packet to the other VSRP2 switches in the same virtual switch and the processing of FIG. 5 can return to block 504.

Referring now to FIG. 6, process 600 begins with a VSRP2 switch (e.g., VSRP2 master switch 202) in master mode. Accordingly, the VSRP2 switch can be configured to forward data traffic on all of its ports. At blocks 602-606, the VSRP2 switch can initialize a countdown variable C3 and execute a countdown process that includes decrementing variable C3 and determining whether C3 has reached zero. If C3 reaches zero, the VSRP2 switch can transmit a VSRP hello packet to other VSRP2 switches in the same virtual switch (block 608) and variable C3 can be re-initialized. If C3 has not yet reached zero, the VSRP2 switch can continue decrementing C3.

In parallel with the countdown process of blocks 604-606, the VSRP2 switch can determine whether a VSRP hello packet is received from another VSRP2 switch in the same virtual switch. If no VSRP hello packet is received, the VSRP2 switch can continue decrementing C3 and checking whether C3 has reached zero according to blocks 604 and 606. If a VSRP hello packet is received, the VSRP2 switch can analyze the packet and determine whether a priority value included in the packet is greater than a priority value stored by the switch (blocks 610, 612).

If the priority value in the received packet is greater than the stored priority value, another VSRP2 switch in the virtual switch is likely a better candidate to act as the master. Accordingly, the VSRP2 switch can transition to backup mode (block 614). When this transition occurs, the parallel countdown process of blocks 604-606 can be terminated. If the priority value in the received packet is less than the stored priority value, the VSRP2 switch can transmit a VSRP hello packet to other VSRP2 switches (block 608) and variable C3 can be re-initialized.

It should be appreciated that processes 400-600 are illustrative and that variations and modifications are possible. For example, although variables C1-C3 are described as "countdown" variables that are decremented until reaching a stopping value (e.g., zero), variable C1-C3 can also be implemented as "count-up" variables that are incremented until reaching a stopping value. Further, steps described as sequential may be executed in parallel, order of steps may be varied, and steps may be modified, combined, added, or omitted. One of ordinary skill in the art will recognize other variations, modifications, and alternatives.

The remaining figures of the present disclosure depict the enhanced processing that can be performed by VSRP2 switches (and VSRP2-aware switches) to support link redundancy in accordance with embodiments of the present invention. FIG. 7 illustrates a process 700 performed by a VSRP2 switch in backup or master confirm mode to facilitate link redundancy. In certain embodiments, the steps of process 700 can be performed in parallel with process 400 or process 500 (depending on whether the switch is in backup or master confirm mode). In one set of embodiments, process 700 can be performed by VSRP2 backup switch 204 of FIG. 2A.

As shown, process 700 begins with the VSRP2 switch operating in backup mode or master confirm mode. At block 702, the VSRP2 switch can create a data structure (e.g., database, array, list, etc.) with an entry for each port or link connecting the switch to other devices/switches in a Layer 2 network. For example, with respect to FIG. 2A, VSRP2 backup switch 204 can create a data structure with an entry for port 226/link 216 (connecting 204 to VSRP2-aware switch 208) and an entry for port 228/link 218 (connecting 204 to VSRP2-aware switch 210).

At block 704, the VSRP2 switch can initialize a countdown variable C4 for each port/link and store the variable value in the corresponding entry in the data structure. The switch can then begin a plurality of countdown processes by decrementing C4 for each port/link and checking whether C4 has reached zero (blocks 706, 708).

In parallel with the countdown processes being performed on a per port/link basis at blocks 704-708, the VSRP2 switch can determine whether a VSRP hello packet has been received over a given port/link from another VSRP2 switch in the same virtual switch (e.g., from VSRP2 master switch 202). As described with respect to FIGS. 5 and 6 above, a VSRP2 switch in master confirm or master mode is configured to transmit VSRP hello packets at regular intervals on all of its ports, which are then propagated to other VSRP2 switches in the virtual switch. For example, VSRP2 master switch 202 can transmit a VSRP hello packet at regular intervals over port 222/link 212 to VSRP2-aware switch 208, which forwards the packet to VSRP2 backup switch 204 over link 216. Similarly, VSRP2 master switch 202 can transmit a VSRP hello packet at regular intervals over port 224/link 214 to VSRP2-aware switch 210, which forwards the packet to VSRP2 backup switch 204 over link 218.

If the VSRP2 switch receives a VSRP hello packet on a given port/link connecting the switch to a device in the Layer 2 network, the VSRP2 switch can determine that a corresponding link between the device and another VSRP2 switch in the virtual switch is alive. For example, if VSRP2 backup switch 204 receives a VSRP hello packet on port 228/218, switch 204 can determine that link 214 between VSRP2 master switch 202 and VSRP2-aware switch 210 is alive (since the VSRP hello packet needs to be sent through link 216 to reach switch 204 at port 228). In this scenario, the VSRP2 switch can analyze the received packet and check whether a priority value in the received packet is greater than the priority value stored for the switch. If the priority value in the received packet is greater (indicating that the packet was sent by the master switch), the value of C4 can be reset for the port/link in the data structure and the countdown of C4 can be restarted (blocks 716-720). If the priority value in the received packet is less than the stored priority value (indicating that the packet was sent by another backup switch in master confirm mode), the VSRP2 switch can continue waiting for additional VSRP hello packets.

If counter variable C4 reaches zero for a given port/link connecting the VSRP2 switch to a device in the Layer 2 network, the VSRP2 switch can determine that a corresponding link between the device and the VSRP2 master switch in the virtual switch has failed. For example, if C4 reaches zero for port/link 228/218, VSRP2 backup switch 204 can determine that link 214 between the device and master VSRP2 switch 202 gone has down (since no VSRP hello packets have been received from master switch 202 in that time interval). In this case, VSRP2 backup switch 204 can change the state of port 228 from blocking to forwarding (block 710), thereby enabling a link level failover from failed link 214 to redundant link 218. This situation is shown in FIG. 2C.

Once the VSRP2 switch activates the redundant port/link per block 710, the switch can transmit a second type of control packet distinct from the VSRP hello packet (referred to as a VSRP2 hello packet) to the Layer 2 device via the redundant link (block 712). For example, VSRP2 backup switch 204 can send a VSRP2 hello packet to VSRP2-aware switch 210 via link 218. The VSRP2 hello packet can notify switch 210 that port 228/link 218 is now active. In response, VSRP-aware switch 210 can perform certain processing steps to facilitate the redirection of data traffic from failed link 214 to redundant link 218. In a particular embodiment, this VSRP2 hello packet can be continually sent from VSRP2 backup switch 204 to VSRP2-aware switch 210 at a predetermined time interval as long as link 218 is active.

While forwarding data traffic on the redundant link, the VSRP2 switch can be considered to be operating in a link redundant submode of backup mode or master confirm mode (block 714). As discussed with respect to FIG. 9 below, the VSRP2 switch can remain in this submode until the failed link becomes available again (or until the VSRP2 switch transitions to master mode).

It should be appreciated that process 700 is illustrative and that variations and modifications are possible. For example, although variable C4 is described as a "countdown" variable that is decremented until reaching a stopping value (e.g., zero), variable C4 can also be implemented as a "count-up" variable that is incremented until reaching a stopping value. Further, steps described as sequential may be executed in parallel, order of steps may be varied, and steps may be modified, combined, added, or omitted. One of ordinary skill in the art will recognize other variations, modifications, and alternatives.

Figure 8:
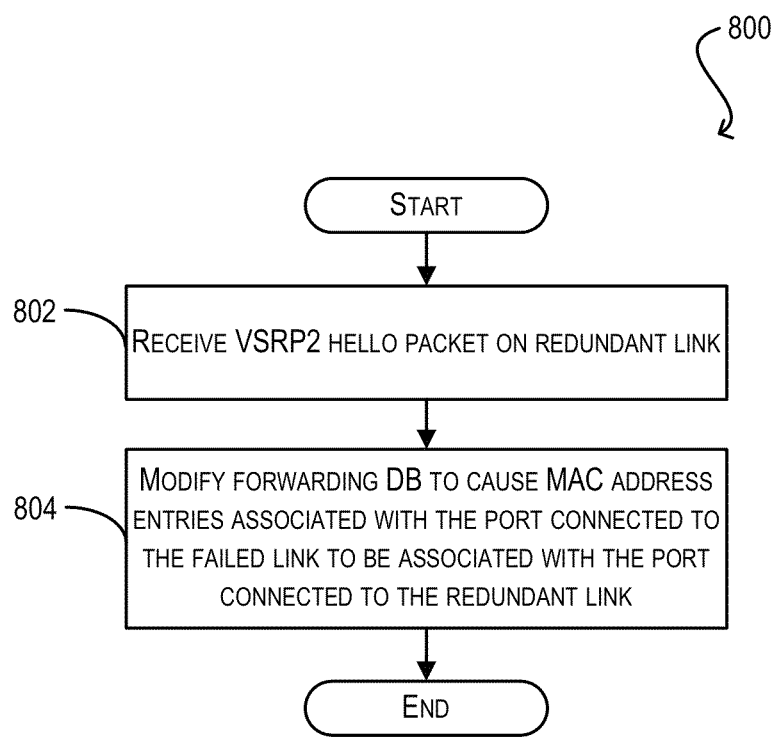
FIG. 8 is a flow diagram of a process performed by a VSRP2-aware switch in accordance with an embodiment of the present invention.

FIG. 8 illustrates a process 800 performed by a VSRP2-aware switch to facilitate link redundancy according to an embodiment of the present invention. In particular, process 800 can performed a VSRP2-aware switch when a redundant link between the switch and a VSRP2 switch becomes active per the processing of FIG. 7.

At block 802, a VSRP2-aware switch can receive a VSRP2 hello packet (e.g., the packet transmitted at block 712 of FIG. 7) from a VSRP2 switch on a redundant link. For example, referring to FIG. 2C, VSRP2-aware switch 210 can receive a VSRP2 hello packet from VSRP2 backup switch on link 218.

At block 804, the VSRP2-aware switch can modify a forwarding database to transfer MAC address entries from the port connected to the failed link to the port connected to the redundant link. For example, VSRP2-aware switch 210 can modify its forwarding database to transfer MAC address entries from the port connected to link 214 to the port connected to link 218. This allows for quick failover recovery and network convergence which, in some embodiments, can be accomplished in a sub-second time frame.

Although not shown in FIG. 8, in certain embodiments the VSRP2-aware switch can flood the VSRP2 hello packet received at block 802 on all of its ports. Thus, when the failed link between the VSRP2-aware switch and the VSRP2 master switch comes back up (i.e., is revived), the VSRP2 master switch can begin transmitting VSRP hello packets again over the revived link.

It should be appreciated that process 800 is illustrative and that variations and modifications are possible. Steps described as sequential may be executed in parallel, order of steps may be varied, and steps may be modified, combined, added, or omitted. One of ordinary skill in the art will recognize other variations, modifications, and alternatives.

Figure 9:
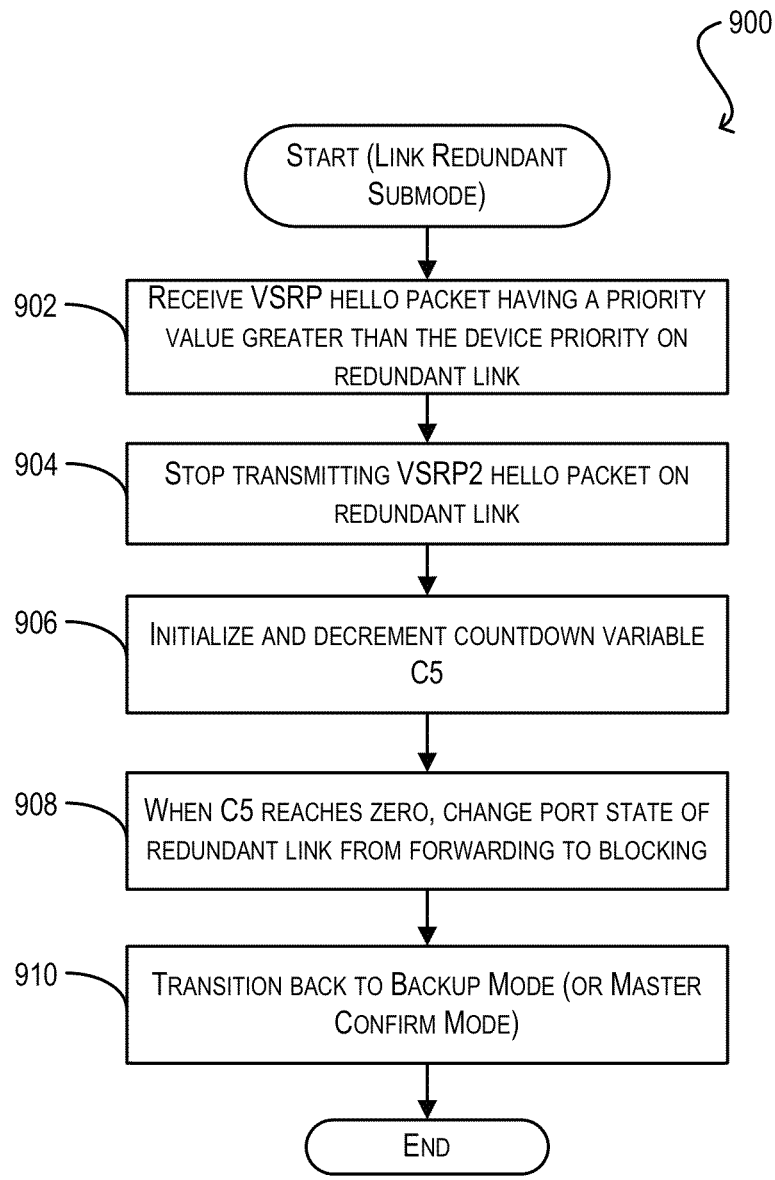
FIG. 9 is a flow diagram of a process performed by a VSRP2 switch in link redundant submode in accordance with an embodiment of the present invention.

FIG. 9 illustrates a process 900 performed by a VSRP2 switch in link redundant submode according to an embodiment of the present invention. In particular, FIG. 9 depicts steps performed by the VSRP2 switch once a previously failed link between a connected device and the VSRP2 master switch has become available again. In one set of embodiments, process 900 can be performed by VSRP2 backup switch 204 after it has transitioned to link redundant submode per block 714 of FIG. 7.

At block 902, a VSRP2 switch operating in link redundant submode can receive a VSRP hello packet having a priority value greater than its stored priority value via the redundant link. For example, VSRP2 backup switch 204 (operating in link redundant submode) can receive a VSRP hello packet having a superior priority value via redundant link 218. In various embodiments, receipt of such a packet indicates that the previously failed link between VSRP2-aware switch 210 and VSRP2 master switch 202 (link 214) has been revived.

At block 904, the VSRP2 switch can stop transmitting VSRP2 hello packets over the redundant link. In addition, the VSRP2 switch can initialize and being decrementing a countdown variable C5 (block 906).

When variable C5 reaches zero, the VSRP2 switch can reset the state of the port connected to the redundant link from forwarding to blocking. For example, with respect to FIG. 2C, VSRP2 backup switch 204 can reset the state of port 228, which has previously been changed from blocking to forwarding in FIG. 7, back to blocking. Thus, VSRP2 backup switch 204 can transition from link redundant submode to normal backup or master confirm mode (where all ports are set to blocking). In this flow, VSRP2 backup switch 204 no longer needs to forward data traffic on link 218 since link 214 between VSRP2-aware switch 210 and VSRP2 master switch 202 has become available again.

It should be appreciated that process 900 is illustrative and that variations and modifications are possible. Steps described as sequential may be executed in parallel, order of steps may be varied, and steps may be modified, combined, added, or omitted. One of ordinary skill in the art will recognize other variations, modifications, and alternatives.

Figure 10:
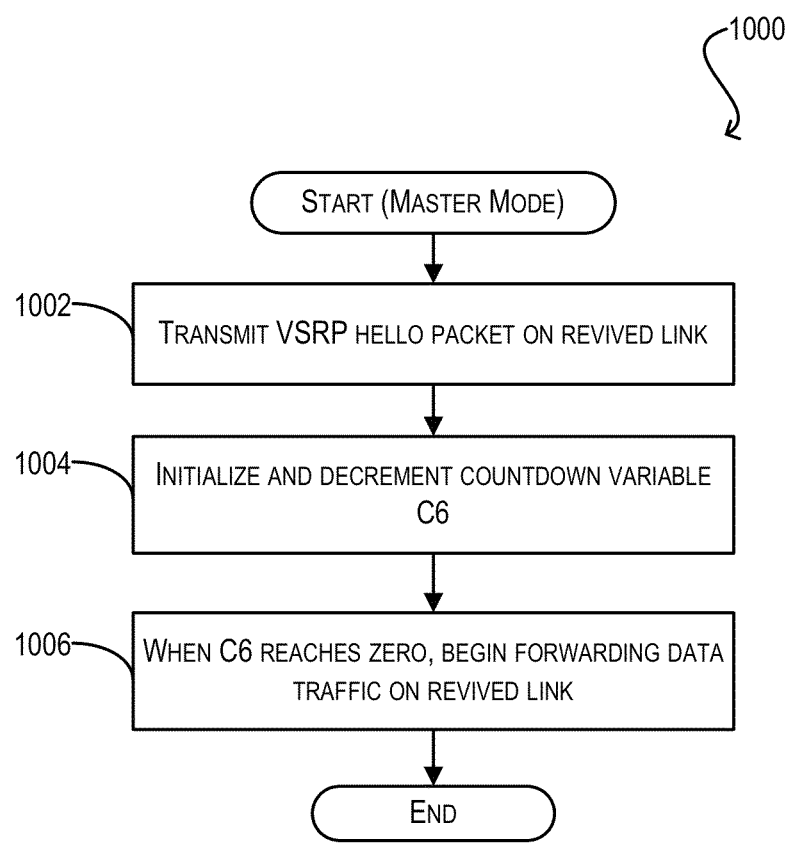
FIG. 10 is a flow diagram of a process performed by a VSRP2 switch in master mode to facilitate link redundancy in accordance with an embodiment of the present invention.

FIG. 10 illustrates a process 1000 performed by a VSRP2 switch in master mode to facilitate link redundancy according to an embodiment of the present invention. In particular, FIG. 10 depicts steps performed by the VSRP2 switch once a previously failed link between a connected device and the switch has become available again. In certain embodiments, the steps of process 1000 can be performed in parallel with the master mode processing of FIG. 6.

At block 1002, the VSRP2 switch can transmit a VSRP hello packet over the revived link. For example, with respect to FIG. 2C, once link 214 has become available again, VSRP2 master switch 202 can transmit a VSRP hello packet via port 224 over link 214. In addition, the VSRP2 switch can initialize and begin decrementing a countdown variable C6 (block 1004).

When variable C6 reaches zero, the VSRP2 switch can being forwarding data traffic over the revived link and thus resume its normal switching duties as the master switch in the virtual switch. (block 1006)

It should be appreciated that process 1000 is illustrative and that variations and modifications are possible. Steps described as sequential may be executed in parallel, order of steps may be varied, and steps may be modified, combined, added, or omitted. One of ordinary skill in the art will recognize other variations, modifications, and alternatives.

Figure 11:
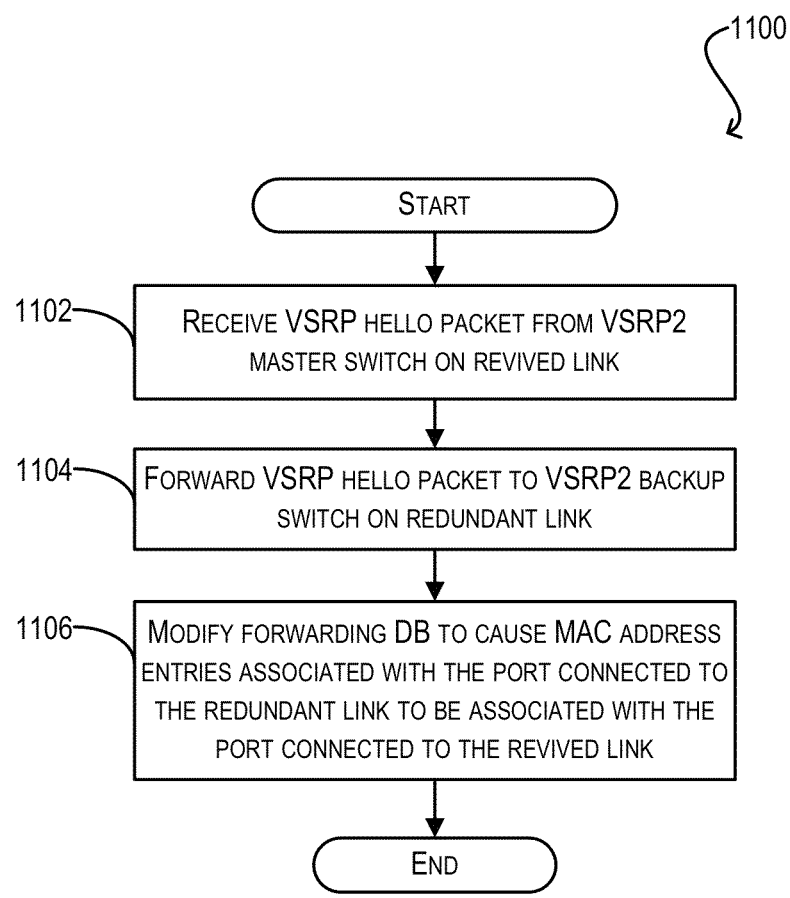
FIG. 11 is a flow diagram of another process performed by a VSRP2-aware switch in accordance with an embodiment of the present invention.

FIG. 11 illustrates another process 1100 performed by a VSRP2-aware switch to facilitate link redundancy according to an embodiment of the present invention. In particular, process 11100 can performed when a previously failed link between the VSRP2-aware switch and a VSRP2 master switch is revived. In one set of embodiments, process 1100 can be performed by VSRP2-aware switch 210 while process 1000 is being performed by VSRP2 master switch 202 and process 900 is being performed by VSRP2 backup switch 204.

At block 1102, a VSRP2-aware switch can receive a VSRP hello packet (e.g., the packet transmitted at block 1004 of FIG. 10) from a VSRP2 switch on a link that is different from the link on which it is currently forwarding data. For example, with respect to FIG. 2C, VSRP2-aware switch 210 can receive a VSRP hello packet from VSRP2 master switch on link 214 once link 214 has been revived (which is different from the link (218) on which switch 210 is currently forwarding data).

At block 1104, the VSRP2-aware switch can forward the VSRP hello packet received from the VSRP2 master switch to the VSRP2 backup switch via the redundant link. This packet can then be received and processed by the VSRP2 backup switch per block 902 of FIG. 9.

At block 1106, the VSRP2-aware switch can modifying it forwarding database to transfer MAC address entries from the port connected to the redundant link to the port connected to the revived link. For example, VSRP2-aware switch 210 can modify its forwarding database to transfer MAC address entries from the port connected to link 218 to the port connected to link 214. This allows for quick failover recovery and network convergence which, in some embodiments, can be accomplished in a sub-second time frame.

It should be appreciated that process 1100 is illustrative and that variations and modifications are possible. Steps described as sequential may be executed in parallel, order of steps may be varied, and steps may be modified, combined, added, or omitted. One of ordinary skill in the art will recognize other variations, modifications, and alternatives.

Figure 12:
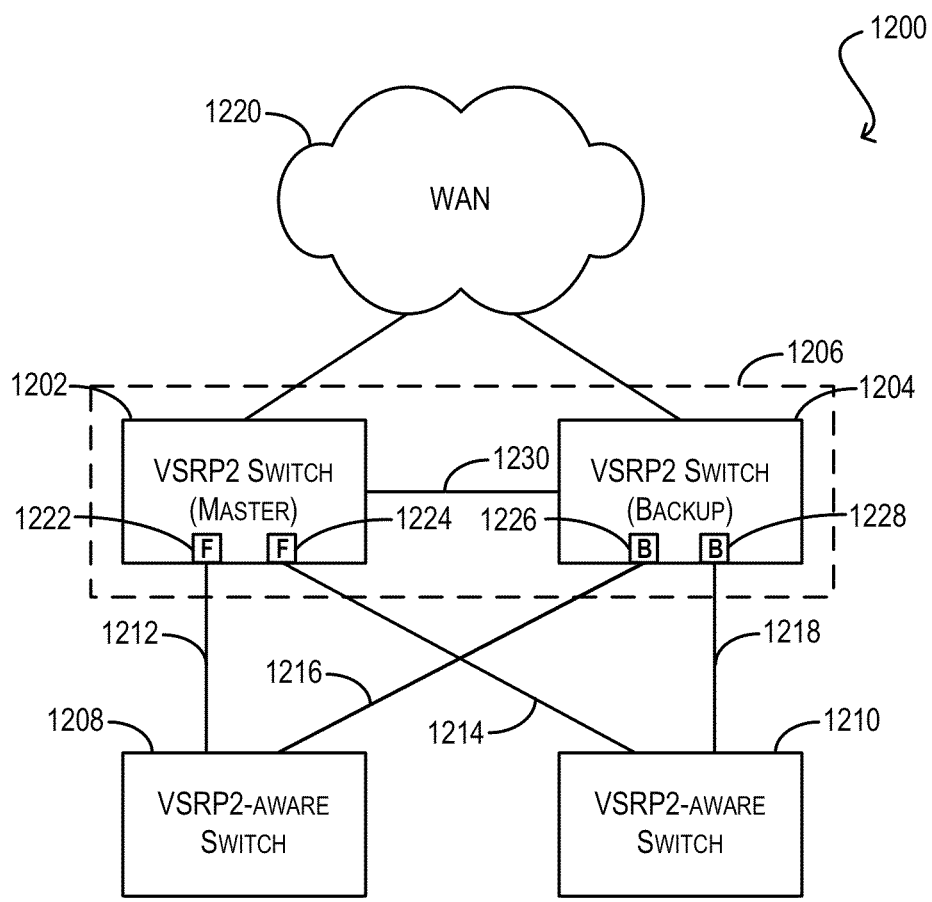
FIG. 12 is a simplified block diagram of another network topology including a VSRP2 virtual switch in accordance with an embodiment of the present invention.

As described above, in certain embodiments one or more VSRP2 switches in a virtual switch can carry out Layer 3 routing functionality in addition to Layer 2 switching functionality. If routing data is replicated across all of the switches in the virtual switch, no additional processing or topological changes are required to support failover of routing functionality when a particular switch fails. However, if routing data is maintained by a single switch in the virtual switch, direct links can be added between the VSRP2 switches to forward Layer 3 traffic to the appropriate switch. FIG. 12 illustrates an example of such a direct link 1230 between VSRP2 switches 1202 and 1204.

Although specific embodiments of the present invention are described above, it should be appreciated that various modifications, alterations, alternative constructions, and equivalents are within the scope of the invention. For instance, although certain embodiments are described as enabling anonymous interactive communication between two parties, the techniques described herein can be used to enable anonymous interactive communication between any number of parties. As one example, an anonymous sender can send an anonymous message to a group of known recipients, and any of the known recipients can reply to everyone while maintaining the anonymity of the original sender. As another example, an anonymous sender can send an anonymous message to a known recipient and copy a third party (that is known to the sender but anonymous to the recipient). The recipient can then reply to everyone while maintaining the anonymity of the original sender and the copied third party.

Further, although certain embodiments are described with respect to certain flow diagrams and steps, it should be apparent to those skilled in the art that the scope of the present invention is not limited to the described diagrams/steps.

Yet further, although certain embodiments are described using a particular combination of hardware and software, it should be recognized that other combinations of hardware and software are also within the scope of the present invention. As software, certain embodiments can be encoded as program code stored on a computer-readable storage medium.

The specification and drawings are, accordingly, to be regarded in a illustrative rather than restrictive sense. It will be evident that additions, subtractions, and other modifications can be made thereunto without departing from the broader spirit and scope of the invention as set forth in the following claims.

What is claimed is:

1. A switch for use in a system of switches, the system of switches acting as a virtual switch, the switch comprising:
   a processor;

a plurality of ports including a first port for communicatively coupling the switch to a first device in a network; and a non-transitory computer readable storage medium having stored thereon executable program code which, when executed by the processor, causes the processor to:
determine whether a network link between the first device and another switch in the system of switches is unavailable; and
if the network link is unavailable:
set the first port to forward data traffic; and
transmit a first type of control packet to the first device, the first type of control packet indicating that the first port has been set to forward data traffic.

2. The switch of claim 1 wherein the network is a Layer 2 network or a Layer 3 network.

3. The switch of claim 1 wherein the network is a loop-free network.

4. The switch of claim 1 wherein the executable program code further causes the processor to set the first port to block data traffic prior to the determining.

5. The switch of claim 1 wherein the executable program code further causes the processor to retransmit the first type of control packet to the first device at a predefined time interval.

6. The switch of claim 1 wherein the determining comprises:
initializing a counter for the first port; and
if the counter expires before receiving a second type of control packet on the first port, determining that the network link is unavailable.

7. The switch of claim 6 wherein the determining further comprises:
if the second type of control packet is received on the first port before the counter expires:
determining whether a first priority value included in the second type of control packet is greater than a second priority value stored by the switch; and
if the first priority value is greater than the second priority value, determining that the network link is available.

8. The switch of claim 6 wherein switches in the system of switches are configured to communicate their status to each other via the second type of control packet.

9. The switch of claim 6 wherein the executable program code further causes the processor to, subsequently to setting the first port to forward data traffic:
receive the second type of data packet on the first port;
initialize another counter for the first port; and
when the another counter expires, reset the first port to block data traffic.

10. The switch of claim 6 wherein the first type of control packet is a VSRP2 hello packet.

11. The switch of claim 10 wherein the second type of control packet is a VSRP hello packet.

12. The switch of claim 1 wherein the switch provides both Layer 2 switching and Layer 3 routing functionality.

13. The switch of claim 12 wherein the plurality of ports further include a second port dedicated for communication with the another switch.

14. A switch for use in a system of switches, the system of switches acting as a virtual switch, the switch comprising:
a first port for communicatively coupling the switch to a first device in a Layer 2 network;
a second port for communicatively coupling the switch to a second device in the Layer 2 network;
a processor; and
a non-transitory computer readable storage medium having stored thereon executable program code which, when executed by the processor, causes the processor to:
act in concert with another switch in the system of switches to provide route redundancy for the Layer 2 network;
set the first port and the second port to a blocking state;
determine whether a network link between the first device and the another switch is unavailable; and
if the network link is unavailable, set the first port to a forwarding state while keeping the second port in the blocking state.

15. A method comprising:
setting, by a first switch, a port of the first switch to block data traffic, wherein the port is configured to communicatively couple the first switch to a device in a Layer 2 network, and wherein the first switch is for use in a system of switches, the system of switches acting as a virtual switch;
determining, by the first switch, whether a network link between the device and another switch in the system of switches is unavailable; and
if the network link is unavailable:
setting, by the first switch, the port to forward data traffic; and
transmitting a control packet to the device, the control packet indicating that the port has been set to forward data traffic.

16. A network device comprising:
a first port for communicatively coupling the network device to a first redundant switch in a system of redundant switches;
a second port for communicatively coupling the network device to a second redundant switch in the system of redundant switches;
a processor; and
a non-transitory computer readable storage medium having stored thereon executable program code which, when executed by the processor, causes the processor to:
forward data traffic through the first port without forwarding data traffic through the second port;
receive a first type of control packet on the second port, the first type of control packet indicating that future data traffic should be forwarded through the second port; and
in response to receiving the first type of control packet, modify a forwarding database of the network device to cause a MAC address associated with the first port to be associated with the second port.

17. The network device of claim 16 wherein the first redundant switch and the second redundant switch are configured to act in concert as a VSRP2 virtual switch.

18. The network device of claim 16 wherein the executable program code further causes the processor to, subsequently to modifying the forwarding database:
receive a second type of control packet on the first port;
forward the second type of control packet through the second port; and
modify the forwarding database to cause a MAC address associated with the second port to be associated with the first port.

19. The network device of claim 17 wherein the second type of data packet is a VSRP hello packet.

* * * * *